(12) United States Patent
Maurer et al.

(10) Patent No.: US 12,489,906 B2
(45) Date of Patent: Dec. 2, 2025

(54) PROCESSING OF RESIDUALS IN VIDEO CODING

(71) Applicant: V-NOVA INTERNATIONAL LTD, London (GB)

(72) Inventors: Florian Maurer, London (GB); Lorenzo Ciccarelli, London (GB)

(73) Assignee: V-NOVA INTERNATIONAL LTD, London (GB)

( * ) Notice: Subject to any disclaimer, the term of this patent is extended or adjusted under 35 U.S.C. 154(b) by 155 days.

(21) Appl. No.: 18/549,865

(22) PCT Filed: Mar. 11, 2022

(86) PCT No.: PCT/GB2022/050639
§ 371 (c)(1),
(2) Date: Sep. 8, 2023

(87) PCT Pub. No.: WO2022/189806
PCT Pub. Date: Sep. 15, 2022

(65) Prior Publication Data
US 2024/0155132 A1    May 9, 2024

(30) Foreign Application Priority Data
Mar. 12, 2021 (GB) ...................................... 2103498

(51) Int. Cl.
*H04N 19/14* (2014.01)
*H04N 19/122* (2014.01)
(Continued)

(52) U.S. Cl.
CPC .......... *H04N 19/14* (2014.11); *H04N 19/122* (2014.11); *H04N 19/177* (2014.11); *H04N 19/196* (2014.11)

(58) Field of Classification Search
None
See application file for complete search history.

(56) References Cited

U.S. PATENT DOCUMENTS 8,396,127 B1 * 3/2013 Bultje ................. H04N 19/174
375/240.27
10,769,442 B1 * 9/2020 Ding ...................... G06T 7/254
(Continued)

FOREIGN PATENT DOCUMENTS

WO    2020188229    9/2020
WO    2020188273    9/2020

OTHER PUBLICATIONS

International Search Report for application No. PCT/GB2022/050639 dated Jun. 9, 2022.
(Continued)

*Primary Examiner* — Kaitlin A Retallick
(74) *Attorney, Agent, or Firm* — Workman Nydegger

(57) ABSTRACT

According to aspects of the invention there is provided a method of modifying sets of residuals data where residual data can be used to correct or enhance data of a base stream, for example a frame of a video encoded using a legacy video coding technology. According to a first aspect there is provided a method of encoding an input video, the method comprising: receiving an input video comprising a plurality of frames; generating one or more sets of residuals on a frame-by-frame basis based on a difference between a given frame of the input signal and one or more reconstructed versions of the given frame at one or more respective spatial resolutions; selectively modifying the one or more sets of residuals; and encoding the one or more sets of modified residuals to generate one or more respective encoded streams for the input video, wherein the method further comprises: determining a sum of absolute differences pixel metric based on one or more of the plurality of frames, the pixel metric being determined for one or more coding units of the one or more of the plurality of frames; and wherein the
(Continued)

one or more sets of residuals are selectively modified based on the pixel metric.

18 Claims, 17 Drawing Sheets

(51) Int. Cl.
    *H04N 19/177*   (2014.01)
    *H04N 19/196*   (2014.01)

(56) References Cited

U.S. PATENT DOCUMENTS

| | | | | |
|---|---|---|---|---|
| 2010/0322306 | A1* | 12/2010 | Au | H04N 19/124 |
| | | | | 375/240.03 |
| 2016/0007038 | A1* | 1/2016 | Chou | H04N 19/182 |
| | | | | 375/240.03 |
| 2020/0099933 | A1* | 3/2020 | Tanner | H04N 19/103 |
| 2021/0185313 | A1* | 6/2021 | Ivanovic | G06N 5/04 |
| 2022/0201307 | A1* | 6/2022 | Yea | H04N 19/33 |

OTHER PUBLICATIONS

Written Opinion of the International Searching Authority for application No. PCT/GB2022/050639 dated Jun. 9, 2022.

Sullivan G J; Wiegand T, "Rate-distortion optmization for video compression", USA Nov. 1, 1998 (Nov. 1, 1998), vol. {0} 15, No. {0} 6, p. 74-90, Retrieved from the Internet: URL:http://www.img.ix.it.pt/~fp/cav/Additional_material/RD%20Optimization%20for%20Video%Compression.pdf XP055480988 DOI: 10.1109/79.733497 external link ISSN:1053-5888.

Wien M, "Variable block-size transforms for H.264/AVC", IEEE Transactions on Circuits and Systems for Video Technology, IEEE, USA, vol. {0} 13, No. {0} 7, Jul. 1, 2003 (Jul. 1, 2003), p. 604-613, XP011099253 DOI: 10.1109/TCSVT.2003.815380 external link ISSN:1051-8215.

"Test Model 5.0 of Low Complexity Enhancement Video Coding", No. {0} n19804, Dec. 4, 2020 (Dec. 4, 2020), 132. MPEG Meeting; Oct. 12-Oct. 16, 2020; Online; (Motion Picture Expert Group or ISO/IEC JTC1/SC29/WG11), Retrieved from the Internet: URL:https://dms.mpeg.expert/doc_end_user/documents/132_OnLine/wg11/MDS19804_WG04_N00028.zip WG04N0028.docx XP030291626 [retrieved on Dec. 4, 2020].

International Preliminary Report on Patentability received for PCT Patent Application No. PCT/GB2022/050639, mailed on Sep. 21, 2023, 11 pages.

Test Model 5.0 of Low Complexity Enhancement Video Coding, 132. MPEG Meeting; Oct. 12-Oct. 16, 2020; Online; (Motion Picture Expert Group or ISO/IEC JTC1/SC29/WVG11), No. n19804 Dec. 4, 2020.

* cited by examiner

PROCESSING OF RESIDUALS IN VIDEO CODING

CROSS-REFERENCE TO RELATED APPLICATIONS

This application is a 371 US Nationalization of International Application No. PCT/GB2022/050639, filed Mar. 11, 2022, which claims priority to GB Patent Application No. 2103498.8, filed Mar. 12, 2021, the disclosures of which are hereby incorporated by reference herein in their entirety.

BACKGROUND

A hybrid backward-compatible coding technology has been previously proposed, for example in WO 2014/170819 and WO 2018/046940, the contents of which are incorporated herein by reference.

Processing residuals in video coding has previously been proposed, for example in WO 2020/188229, the contents of which are incorporated herein by reference.

A low complexity enhancement video coding system has previously been described, for example in WO 2020/188273 and in ISO/IEC 23094-2 (first published draft in January 2020), known as the "LCEVC standard" or "LCEVC", the contents of which are incorporated herein by reference.

A method is proposed therein which parses a data stream into first portions of encoded data and second portions of encoded data; implements a first decoder to decode the first portions of encoded data into a first rendition of a signal; implements a second decoder to decode the second portions of encoded data into reconstruction data, the reconstruction data specifying how to modify the first rendition of the signal; and applies the reconstruction data to the first rendition of the signal to produce a second rendition of the signal.

An addition is further proposed therein in which a set of residual elements is useable to reconstruct a rendition of a first time sample of a signal. A set of spatio-temporal correlation elements associated with the first time sample is generated. The set of spatio-temporal correlation elements is indicative of an extent of spatial correlation between a plurality of residual elements and an extent of temporal correlation between first reference data based on the rendition and second reference data based on a rendition of a second time sample of the signal. The set of spatio-temporal correlation elements is used to generate output data. As noted, the set of residuals are encoded to reduce overall data size.

Optimisations are sought to further reduce overall data size while balancing the objectives of not compromising the overall impression on the user once the signal has been reconstructed; and, optimising processing speed and complexity.

Video data is difficult to effectively compress as it can include many different types of feature, from the high-speed motion of sporting events to relatively static portions of text and logos. Often different types of context are mixed during a single broadcast or video transmission, e.g. a team sheet for a sporting event may be primarily static text before cutting to the sporting event with high-speed motion. Compression approaches that operate well for one feature type often do not work well on another feature type.

SUMMARY OF THE INVENTION

According to a first aspect of the invention, there is provided a method of encoding an input video as recited in independent claim 1.

According to one aspect, there is provided a non-transitory computer readable medium storing instructions that when executed by a processor cause the processor to perform one of the methods described herein.

Preferred embodiments are recited in the dependent claims. Other non-claimed aspects are also described below.

According to aspects of the invention there is provided a method of modifying sets of residuals data where residual data can be used to correct or enhance data of a base stream, for example a frame of a video encoded using a legacy video coding technology.

According to a first aspect there is provided a method of encoding an input signal, the method comprising: receiving an input signal; generating one or more sets of residuals based on a difference between the input signal and one or more reconstructed signals at one or more respective resolutions; modifying the one or more sets of residuals based on a selected residual mode; and encoding the one or more sets of modified residuals to generate one or more respective encoded streams, wherein the encoding includes transforming the one or more sets of modified residuals, and wherein the modifying includes selecting a subset of residuals not to encode based on the selected residual mode.

The input signal may preferably be an image, more preferably a video signal comprising a plurality of frames. Residuals may correspond to picture elements or elements of a video frame. They may be viewed as a "picture of differences". A set of residuals may comprise one or more residuals, each corresponding to a particular signal element. In one case, a set of residuals may comprise residual values that correspond to pixels of an input image or frame at one or more resolutions. Encoding may comprise a series of operations for example, transformation, quantization and entropy encoding. Modification occurs prior to transformation of the residuals such that transformed coefficients are based on the modified residuals, such that changes are propagated through the pipeline and transformation computation is reduced.

By modifying the residuals prior to encoding, overall data size may be reduced and/or computational efficiency may be optimised, while balancing potential impact on viewer experience once the signal is reconstructed at a decoder. Modification may comprise changing a quantization parameter of an encoding operation or deleting, or de-selecting, a subset of the one or more sets of residuals. The step of selecting a subset of residuals not to encode based on the selected residual mode may be implemented by de-selecting a plurality of residuals for transformation or by quantizing a set of transform coefficients to zero, where the transform coefficients represent corresponding input residuals. In other cases, not propagating a subset of residuals may comprise setting values for the subset to zero. De-selecting residuals prior to transformation may improve granularity of modification, selection and analysis.

The input signal may be at a first resolution. The method may further comprise: downsampling the input signal to create a downsampled signal at a second resolution; receiving a base encoded signal from a base encoder, the base encoded signal being generated by encoding the downsampled signal using the base encoder; reconstructing a signal from the base encoded signal to generate a first reconstructed signal within the one or more reconstructed signals; and comparing the first reconstructed signal to the input signal to generate a first set of residuals within the one or more sets of residuals. Encoding the downsampled signal may be performed by a remote or third-party component and optionally implemented remotely, such as a legacy, existing or future-implemented codec. The residuals are usable to reconstruct an input signal. The residuals may be used to correct for artefacts introduced by the encoding and reconstruction process.

Comparing the first reconstructed signal to the input signal to generate a first set of the one or more sets of residuals may comprise: decoding the base encoded signal to produce a base decoded signal; and using a difference between the base decoded signal and the down-sampled version of the input signal to produce the first set of residuals, and wherein the method further comprises: producing a second set of residuals within the one or more sets of residuals by: correcting the base decoded signal using the first set of residuals to create a corrected decoded version; upsampling the corrected decoded version; and using a difference between the corrected decoded signal and the input signal to produce the second set of residuals, wherein the modifying is performed individually for one or more of the first and second sets of residuals. Each set of residuals may be modified in a similar manner or differently or not at all. Accordingly, the residuals may be modified to optimise how they are used. For example more fidelity may be needed at the highest level and where residuals are correcting artefacts in a base coding scheme, different residuals may be more important. In this manner, by filtering certain subsets of residuals, a bit rate may be reduced and/or allow for more capacity for other corrections.

A first set of residuals may be at the first spatial resolution and a second set of residuals is at a second spatial resolution, the first spatial resolution being lower than the second spatial resolution. For example, the first set of residuals may be standard definition or high definition (SD or HD) and the second set of residuals may be high definition or ultra-high definition (HD or UHD).

The step of modifying may comprise: ranking residuals within the one or more sets of residuals; and, filtering the residuals based on the ranking. The filtering may be based on a predetermined or dynamically variable threshold. By filtering and ranking residuals, the subset may be tailored such that high priority residuals are encoded but low priority residuals are de-selected and hence the efficiency of the encoding pipeline is optimised. Priority may be based on a variety of factors including spatio-temporal characteristics.

The modifying may comprise: determining a score associated with each residual or group of residuals, wherein the score may be indicative of a relative importance of each residual or group of residuals, and wherein the selecting of a subset of residuals not to encode may be based on the score associated with each residual or group of residuals. Scoring the residuals provides a high degree of control over the modification process. Determining may also be obtaining, computing or receiving. The score may also be considered a metric. The score or metric may be associated with a specific residual, a tile of residuals or a coding unit of residuals, where a tile represents a group of neighbouring residuals of a predetermined size, a plurality of tiles making up the set of residuals.

The score may be based on one or more spatial and/or temporal characteristics of the input signal. The score may be based on a level of contrast or a level of texture of the input signal or both. In examples, the luminance component of the input signal may be analysed to determine the score. The terms luma and luminance component will be used interchangeably throughout.

The method may comprise: quantizing the one or more sets of residuals. Quantizing the one or more sets of residuals may comprise applying a deadzone of a variable size.

The deadzone may be determined as a function of a quantization step width. Quantizing the one or more sets of residuals may comprise: quantizing the one or more sets of residuals at a first stage to effect the modifying; and quantizing the one or more sets of residuals at a second stage to effect the encoding. The quantizing at the first stage may be selective based on the score. The first quantizing stage may be thought of as pre-quantizing. Note pre-quantizing may be particularly beneficial where the contrast of an image, frame or set of residuals is particularly low, such that priority residuals are concentrated at very low values. A deadzone may be an area of a spectrum in which no values are encoded. This deadzone may correspond to a distance from the threshold or may be a multiplier (e.g. of a step width). In a further example, the step widths of the quantizer may be modified based on the processing.

The modifying may comprise: comparing the score to a set of ranges, wherein: responsive to the score falling in a first range, the residual or group of residuals are not encoded; responsive to the score falling in a second range, the residual or group of residuals are compared to a quantization deadzone, wherein the residual or group of residuals are not encoded if they fall within the deadzone; responsive to the score falling in a third range, the residual or group of residuals are pre-quantized with a first quantization step width; and responsive to the score falling in a fourth range, the residual or group of residuals are passed for encoding without modification.

Modifying the one or more sets of residuals may comprise: obtaining categorisations for residuals or groups of residuals; and applying the modifying based on the categorisations. A category may for example include background or foreground. Obtaining categorisations comprises: categorising residuals or groups of residuals based on one or more spatial and/or temporal characteristics of the input signal or of the one or more sets of residuals.

The one or more spatial and/or temporal characteristics may comprise one or more selected from a group comprising: spatial activity between one or more signal elements or groups of signal elements; a level of contrast between one or more signal elements or groups of signal elements; a measure of change in one or more spatial directions; temporal activity between one or more signal elements or groups of signal elements; a measure of change in one or more temporal directions; spatial activity between one or more residuals; temporal activity between one or more residuals; and, a difference between different sets of the one or more sets of residuals or a difference in one or more spatial and/or temporal characteristics between different sets of the one or more sets of residuals.

The modifying may comprise setting control flags indicative of whether residuals are to be encoded in the encoding, wherein the encoding is selectively performed based on the control flags. Note that a 0 or 1 value could be injected during processing or certain blocks skipped entirely. However, the processing is still relative to the residuals, that is, effectively setting a set of residual values to 0. This may be thought of as non-destructive selection.

The modifying may comprise: receiving a set of residual weights, the residual weights including zero values; and applying the set of residual weights to residuals within one of the one or more sets of residuals to generate a weighted set of residuals. Following the applying of the set of residual weights, the method may further comprise thresholding the weighted set of residuals using a set of thresholds. By weighting the residuals, a high degree of flexibility can be applied to the modification. The weights may be a matrix of non-binary values and as such, each residual may be assigned a non-binary value which can then be used to filter or prioritise the residuals flexibly, scalably and with a high amount of detail. The one or more of the set of residual weights and the set of thresholds may be determined based on a classification of the input signal. Similarly, the classification may be based on the residuals or a reconstructed version of the input signal using the residuals. This latter example may involve an element of iteration or feedback such that the modification is improved based on analysis of the reconstructed version.

The set of residual weights may comprise a residual mask. The residual mask may be received from a remote location. The residual mask may be pre-generated based on pre-processing of the input signal prior to encoding. Thus the remote location may perform a computationally expensive exercise and the encoder may be 'dumb'. For example, the encoder may be limited in capability. Residual masks may be generated once for a particular video and re-used across multiple encoders and/or at multiple times to reduce resource usage. Amongst other advantages, such a remote storage of residual masks may provide for scalable encoding or reproduction of residual masks. In another advantage, a complex algorithm may be applied to generate the residual masks, such as a detailed machine learning based algorithm that facilitates central complex analysis and determination of the mask and as such the mask may be improved by being retrieved from a remote location. The retrieved mask may be used for all frames of an input signal where the input signal is a video or a different mask may be used for each frame.

The modifying may be performed on coding units of residuals. In examples, a coding unit is a block, region or subset of a frame or surface on which computations are performed. In this way, it may be thought of as a basic processing unit.

According to a further aspect, there may be provided a method of encoding an input signal, the method comprising: receiving an input signal; generating a set of residuals based on a difference between the input signal and a reconstructed signal; determining a set of perception metrics corresponding to the set of residuals; selectively pre-quantizing the set of residuals based on the set of perception metrics; and transforming and quantizing the one or more sets of modified residuals to generate one or more respective encoded streams. Accordingly, the transforming and quantizing can be made more efficient. The perception metric facilitates the balance between efficiency and user or viewer experience.

Determining a set of perception metrics may comprise: for each given residual group in a set of residual groups: determining if a perception metric is to be used for the given residual group; responsive to a determination that the perception metric is to be used, obtaining at least one perception metric for the given residual group. Accordingly, a metric maybe be determined at a level for which it may have a degree of impact.

The method may comprise: comparing a perception metric for one or more residuals to a set of ranges, wherein: responsive to the perception metric falling in a first range, the one or more residuals are not encoded; responsive to the perception metric falling in a second range, the one or more residuals are compared to a pre-quantization deadzone, wherein the one or more residuals are not encoded if they fall within the deadzone; responsive to the perception metric falling in a third range, the one or more residuals are pre-quantized with a pre-quantization step width; and responsive to the perception metric falling in a fourth range, the one or more residuals are passed for encoding without modification.

An encoder configured to carry out the method of any of the above aspects of implementations may also be provided.

According to a further aspect there may be provided an encoder for encoding an input video comprising: a first encoder to receive and encode a first set of residuals to create a first enhancement stream; a second encoder to receive and encode a second set of residuals to create a second enhancement stream, wherein the first set of residuals are based on a comparison of a first version of the input video and a first reconstructed version of the input video, the first reconstructed version being derived from a base encoder, the base encoder being different to the first and second encoders, wherein the second set of residuals are based on a comparison of a second version of the input video and a second reconstructed version of the input video, the second reconstructed version being derived from the first reconstructed version, and wherein one or more of the first and second encoders are configured to selectively pre-process residuals prior to encoding such that a subset of non-zero values within respective ones of the first and second set of residuals are not present in respective first and second enhancement level streams.

The first and second encoders may each independently process a set of coding units for each frame of video.

According to a further aspect there may be provided an encoder for encoding an input video comprising: a first encoder to receive and encode a first set of residuals to create a first enhancement stream; a second encoder to receive and encode a second set of residuals to create a second enhancement stream; a configuration interface to receive configuration data; wherein the first set of residuals are based on a comparison of a first version of the input video and a first reconstructed version of the input video, the first reconstructed version being derived from a base encoder, the base encoder being different to the first and second encoders, wherein the second set of residuals are based on a comparison of a second version of the input video and a second reconstructed version of the input video, the second reconstructed version being derived from the first reconstructed version, wherein the configuration data comprises residual masks for one or more of the first and second encoders, wherein respective ones of the first and second encoders are configured to selectively apply the residual masks to respective ones of the first and second set of residuals prior to encoding such that a subset of non-zero values within are not present in respective first and second enhancement level streams.

According to further aspects of the invention there may be provided computer readable media which when executed by a processor cause the processor to perform any of the methods of the above aspects.

DETAILED DESCRIPTION

Figure 1:
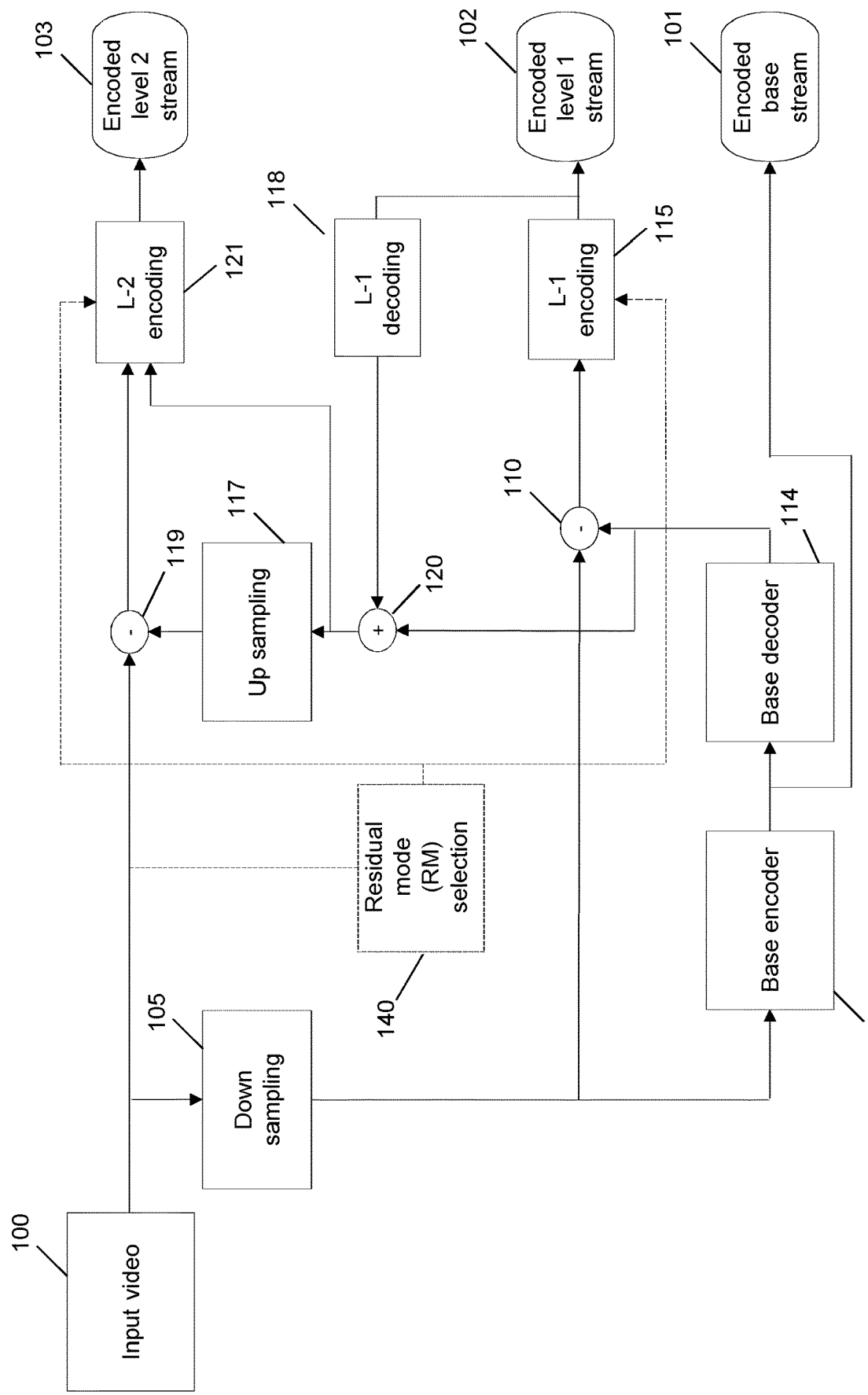
FIG. 1 shows a high-level schematic of an encoding process.

The present invention relates to methods. In particular, the present invention relates to methods for encoding and decoding signals. Processing data may include, but is not limited to, obtaining, deriving, outputting, receiving and reconstructing data.

The coding technology discussed herein is a flexible, adaptable, highly efficient and computationally inexpensive coding format which combines a video coding format, a base codec, (e.g. AVC, HEVC, or any other present or future codec) with an enhancement level of coded data, encoded using a different technique. The technology uses a down-sampled source signal encoded using a base codec to form a base stream. An enhancement stream is formed using an encoded set of residuals which correct or enhance the base stream for example by increasing resolution or by increasing frame rate. There may be multiple levels of enhancement data in a hierarchical structure. In certain arrangements, the base stream may be decoded by a hardware decoder while the enhancement stream may be suitable for a software implementation.

It is important that any optimisation used in the new coding technology is tailored to the specific requirements or constraints of the enhancement stream and is of low complexity. Such requirements or constraints include: the potential reduction in computational capability resulting from the need for software decoding of the enhancement stream; the need for combination of a decoded set of residuals with a decoded frame; the likely structure of the residual data, i.e. the relatively high proportion of zero values with highly variable data values over a large range; the nuances of a quantized block of coefficients; and, the structure of the enhancement stream being a set of discrete residual frames separated into various components. Note that the constraints placed on the enhancement stream mean that a simple and fast entropy coding operation is essential to enable the enhancement stream to effectively correct or enhance individual frames of the base decoded video. Note that in some scenarios the base stream is also being decoded substantially simultaneously before combination, putting a strain on resources.

In one case, the methods described herein may be applied to so-called planes of data that reflect different colour components of a video signal. For example, the methods described herein may be applied to different planes of YUV or RGB data reflecting different colour channels. Different colour channels may be processed in parallel. Hence, references to sets of residuals as described herein may comprise multiple sets of residuals, where each colour component has a different set of residuals that form part of a combined enhancement stream. The components of each stream may be collated in any logical order, for example, each plane at the same level may be grouped and sent together or, alternatively, the sets of residuals for different levels in each plane may be sent together.

Embodiments of the present invention further improve the new coding technology by providing enhanced detail of static elements such as logos or text, whilst also fulfilling the role of a low complexity enhancement by utilising a low complexity processes, namely the sum of absolute differences.

This present document preferably fulfils the requirements of the following ISO/IEC documents: "Call for Proposals for Low Complexity Video Coding Enhancements" ISO/IEC JTC1/SC29/WG11 N17944, Macao, CN, October 2018 and "Requirements for Low Complexity Video Coding Enhancements" ISO/IEC JTC1/SC29/WG11 N18098, Macao, CN, October 2018 (which are incorporated by reference herein). Moreover, approaches described herein may be incorporated into products as supplied by V-Nova International Ltd.

The general structure of the proposed encoding scheme in which the presently described techniques can be applied, uses a down-sampled source signal encoded with a base codec, adds a first level of correction data to the decoded output of the base codec to generate a corrected picture, and then adds a further level of enhancement data to an up-sampled version of the corrected picture. Thus, the streams are considered to be a base stream and an enhancement stream. This structure creates a plurality of degrees of freedom that allow great flexibility and adaptability to many situations, thus making the coding format suitable for many use cases including Over-The-Top (OTT) transmission, live streaming, live Ultra High Definition (UHD) broadcast, and so on. Although the decoded output of the base codec is not intended for viewing, it is a fully decoded video at a lower resolution, making the output compatible with existing decoders and, where considered suitable, also usable as a lower resolution output. In certain cases, a base codec may be used to create a base stream. The base codec may comprise an independent codec that is controlled in a modular or "black box" manner. The methods described herein may be implemented by way of computer program code that is executed by a processor and makes function calls upon hardware and/or software implemented base codecs.

In general, the term "residuals" as used herein refers to a difference between a value of a reference array or reference frame and an actual array or frame of data. The array may be a one or two-dimensional array that represents a coding unit. For example, a coding unit may be a 2×2 or 4×4 set of residual values that correspond to similar sized areas of an input video frame. It should be noted that this generalised example is agnostic as to the encoding operations performed and the nature of the input signal. Reference to "residual data" as used herein refers to data derived from a set of residuals, e.g. a set of residuals themselves or an output of a set of data processing operations that are performed on the set of residuals. Throughout the present description, generally a set of residuals includes a plurality of residuals or residual elements, each residual or residual element corresponding to a signal element, that is, an element of the signal or original data. The signal may be an image or video. In these examples, the set of residuals corresponds to an image or frame of the video, with each residual being associated with a pixel of the signal, the pixel being the signal element. Examples disclosed herein describe how these residuals may be modified (i.e. processed) to impact the encoding pipeline or the eventually decoded image while reducing overall data size. Residuals or sets may be processed on a per residual element (or residual) basis, or processed on a group basis such as per tile or per coding unit where a tile or coding unit is a neighbouring subset of the set of residuals. In one case, a tile may comprise a group of smaller coding units. Note that the processing may be performed on each frame of a video or on only a set number of frames in a sequence.

In general, each or both enhancement streams may be encapsulated into one or more enhancement bitstreams using a set of Network Abstraction Layer Units (NALUs). The NALUs are meant to encapsulate the enhancement bitstream in order to apply the enhancement to the correct base reconstructed frame. The NALU may for example contain a reference index to the NALU containing the base decoder reconstructed frame bitstream to which the enhancement has to be applied. In this way, the enhancement can be synchronised to the base stream and the frames of each bitstream combined to produce the decoded output video (i.e. the residuals of each frame of enhancement level are combined with the frame of the base decoded stream). A group of pictures may represent multiple NALUs.

Returning to the initial process described above, where a base stream is provided along with two levels (or sub-levels) of enhancement within an enhancement stream, an example of a generalised encoding process is depicted in the block diagram of FIG. 1. An input full resolution video 100 is processed to generate various encoded streams 101, 102, 103. A first encoded stream (encoded base stream) is produced by feeding a base codec (e.g., AVC, HEVC, or any other codec) with a down-sampled version of the input video. The encoded base stream may be referred to as the base layer or base level. A second encoded stream (encoded level 1 stream) is produced by processing the residuals obtained by taking the difference between a reconstructed base codec video and the down-sampled version of the input video. A third encoded stream (encoded level 2 stream) is produced by processing the residuals obtained by taking the difference between an up-sampled version of a corrected version of the reconstructed base coded video and the input video. In certain cases, the components of FIG. 1 may provide a general low complexity encoder. In certain cases, the enhancement streams may be generated by encoding processes that form part of the low complexity encoder and the low complexity encoder may be configured to control an independent base encoder and decoder (e.g. as packaged as a base codec). In other cases, the base encoder and decoder may be supplied as part of the low complexity encoder. In one case, the low complexity encoder of FIG. 1 may be seen as a form of wrapper for the base codec, where the functionality of the base codec may be hidden from an entity implementing the low complexity encoder.

A down-sampling operation illustrated by downsampling component 105 may be applied to the input video to produce a down-sampled video to be encoded by a base encoder 113 of a base codec. The down-sampling can be done either in both vertical and horizontal directions, or alternatively only in the horizontal direction. The base encoder 113 and a base decoder 114 may be implemented by a base codec (e.g. as different functions of a common codec). The base codec, and/or one or more of the base encoder 113 and the base decoder 114 may comprise suitably configured electronic circuitry (e.g. a hardware encoder/decoder) and/or computer program code that is executed by a processor.

Each enhancement stream encoding process may not necessarily include an up-sampling step. In FIG. 1 for example, the first enhancement stream is conceptually a correction stream while the second enhancement stream is up-sampled to provide a level of enhancement.

Looking at the process of generating the enhancement streams in more detail, to generate the encoded Level 1 stream, the encoded base stream is decoded by the base decoder 114 (i.e. a decoding operation is applied to the encoded base stream to generate a decoded base stream). Decoding may be performed by a decoding function or mode of a base codec. The difference between the decoded base stream and the down-sampled input video is then created at a level 1 comparator 110 (i.e. a subtraction operation is applied to the down-sampled input video and the decoded base stream to generate a first set of residuals). The output of the comparator 110 may be referred to as a first set of residuals, e.g. a surface or frame of residual data, where a residual value is determined for each picture element at the resolution of the base encoder 113, the base decoder 114 and the output of the downsampling block 105.

The difference is then encoded by a first encoder 115 (i.e. a level 1 encoder) to generate the encoded Level 1 stream 102 (i.e. an encoding operation is applied to the first set of residuals to generate a first enhancement stream).

As noted above, the enhancement stream may comprise a first level of enhancement 102 and a second level of enhancement 103. The first level of enhancement 102 may be considered to be a corrected stream, e.g. a stream that provides a level of correction to the base encoded/decoded video signal at a lower resolution than the input video 100. The second level of enhancement 103 may be considered to be a further level of enhancement that converts the corrected stream to the original input video 100, e.g. that applies a level of enhancement or correction to a signal that is reconstructed from the corrected stream.

In the example of FIG. 1, the second level of enhancement 103 is created by encoding a further set of residuals. The further set of residuals are generated by a level 2 comparator 119. The level 2 comparator 119 determines a difference between an up-sampled version of a decoded level 1 stream, e.g. the output of an upsampling component 117, and the input video 100. The input to the upsampling component 117 is generated by applying a first decoder (i.e. a level 1 decoder) to the output of the first encoder 115. This generates a decoded set of level 1 residuals. These are then combined with the output of the base decoder 114 at summation component 120. This effectively applies the level 1 residuals to the output of the base decoder 114. It allows for losses in the level 1 encoding and decoding process to be corrected by the level 2 residuals. The output of summation component 120 may be seen as a simulated signal that represents an output of applying level 1 processing to the encoded base stream 101 and the encoded level 1 stream 102 at a decoder.

As noted, an up-sampled stream is compared to the input video which creates a further set of residuals (i.e. a difference operation is applied to the up-sampled re-created stream to generate a further set of residuals). The further set of residuals are then encoded by a second encoder 121 (i.e. a level 2 encoder) as the encoded Level 2 enhancement stream (i.e. an encoding operation is then applied to the further set of residuals to generate an encoded further enhancement stream).

Thus, as illustrated in FIG. 1 and described above, the output of the encoding process is a base stream 101 and one or more enhancement streams 102, 103 which preferably comprise a first level of enhancement and a further level of enhancement. The three streams 101, 102 and 103 may be combined, with or without additional information such as control headers, to generate a combined stream for the video encoding framework that represents the input video 100. It should be noted that the components shown in FIG. 1 may operate on blocks or coding units of data, e.g. corresponding to 2×2 or 4×4 portions of a frame at a particular level of resolution. The components operate without any inter-block dependencies, hence they may be applied in parallel to multiple blocks or coding units within a frame. This differs from comparative video encoding schemes wherein there are dependencies between blocks (e.g. either spatial dependencies or temporal dependencies). The dependencies of comparative video encoding schemes limit the level of parallelism and require a much higher complexity.

FIG. 1 illustrates a residual mode selection block 140. If residual mode (RM) has been selected, residuals are processed (i.e. modified and/or ranked and selected) in order to determine which residuals should be transformed and encoded, i.e. which residuals are to be processed by the first and/or second encoders 115 and 121. Preferably this processing is performed prior to entropy encoding. Residual Mode selection 140 is an optional step that may configure or activate processing or modification of residuals i.e. residual processing is performed according to a selected mode. For example, the "residual mode (RM)" may correspond to a residual pre-processing mode, wherein residuals for enhancement layers are pre-processed prior to encoding. This mode may be turned on and off depending on requirements. For example, the residual mode may be configured via one or more control headers or fields. A residual mode may also be configured based on a pixel metric, such as a sum-of-absolute-differences (SAD) metric. In certain cases, the modification of residuals and/or a particular transformation mode may be controlled based on an aggregate SAD metric that is computed using individual coding unit metrics. These pixel metrics may be based on coding unit blocks of original input frames and/or coding unit blocks of residuals. In alternative embodiments, the residuals may always be modified (i.e. pre-processed) and so selection of a mode is not required. In this case, residual pre-processing may be hard-coded. Examples of residuals processing will be described in detail below. The residual mode, if selected, may act to filter residuals within one or more of the level 1 and level 2 encoding operations, preferably at a stage prior to the encoding sub-components.

Figure 2:
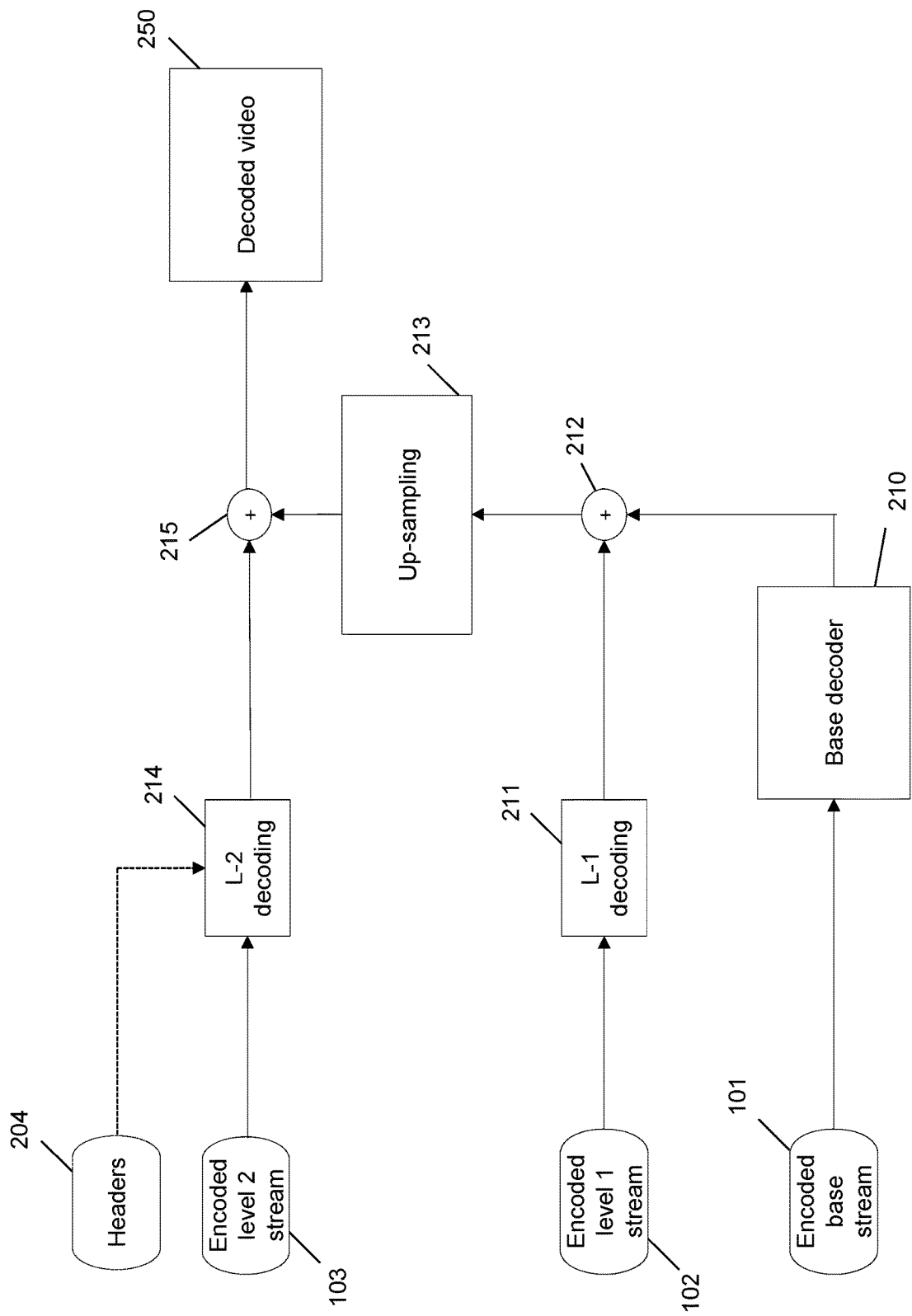
FIG. 2 shows a high-level schematic of a decoding process.

A corresponding generalised decoding process is depicted in the block diagram of FIG. 2. FIG. 2 may be said to show a low complexity decoder that corresponds to the low complexity encoder of FIG. 1. The low complexity decoder receives the three streams 101, 102, 103 generated by the low complexity encoder together with headers 204 containing further decoding information. The encoded base stream 101 is decoded by a base decoder 210 corresponding to the base codec used in the low complexity encoder. The encoded level 1 stream 102 is received by a first decoder 211 (i.e. a level 1 decoder), which decodes a first set of residuals as encoded by the first encoder 115 of FIG. 1. At a first summation component 212, the output of the base decoder 210 is combined with the decoded residuals obtained from the first decoder 211. The combined video, which may be said to be a level 1 reconstructed video signal, is up-sampled by upsampling component 213. The encoded level 2 stream 103 is received by a second decoder 214 (i.e. a level 2 decoder). The second decoder 214 decodes a second set of residuals as encoded by the second encoder 121 of FIG. 1. Although the headers 204 are shown in FIG. 2 as being used by the second decoder 214, they may also be used by the first decoder 211 as well as the base decoder 210. The output of the second decoder 214 is a second set of decoded residuals. These may be at a higher resolution to the first set of residuals and the input to the upsampling component 213. At a second summation component 215, the second set of residuals from the second decoder 214 are combined with the output of the upsampling component 213, i.e. an upsampled reconstructed level 1 signal, to reconstruct decoded video 250.

As per the low complexity encoder, the low complexity decoder of FIG. 2 may operate in parallel on different blocks or coding units of a given frame of the video signal. Additionally, decoding by two or more of the base decoder 210, the first decoder 211 and the second decoder 214 may be performed in parallel. This is possible as there are no inter-block dependencies.

In the decoding process, the decoder may parse the headers 204 (which may contain global configuration information, picture or frame configuration information, and data block configuration information) and configure the low complexity decoder based on those headers. In order to re-create the input video, the low complexity decoder may decode each of the base stream, the first enhancement stream and the further or second enhancement stream. The frames of the stream may be synchronised and then combined to derive the decoded video 250. The decoded video 250 may be a lossy or lossless reconstruction of the original input video 100 depending on the configuration of the low complexity encoder and decoder. In many cases, the decoded video 250 may be a lossy reconstruction of the original input video 100 where the losses have a reduced or minimal effect on the perception of the decoded video 250.

In each of FIGS. 1 and 2, the level 2 and level 1 encoding operations may include the steps of transformation, quantization and entropy encoding (e.g. in that order). Similarly, at the decoding stage, the residuals may be passed through an entropy decoder, a de-quantizer and an inverse transform module (e.g. in that order). Any suitable encoding and corresponding decoding operation may be used. Preferably however, the level 2 and level 1 encoding steps may be performed in software (e.g. as executed by one or more central or graphical processing units in an encoding device).

The transform as described herein may use a directional decomposition transform such as a Hadamard-based transform. Both may comprise a small kernel or matrix that is applied to flattened coding units of residuals (i.e. 2×2 or 4×4 blocks of residuals). More details on the transform can be found for example in patent applications PCT/EP2013/059847 or PCT/GB2017/052632, which are incorporated herein by reference. The encoder may select between different transforms to be used, for example between a size of kernel to be applied. There are many known transforms (for example the Hadamard-based transform, the Discrete Cosine Transform, and so forth), and each transform can use different sized kernels, also referred to as coding units. The approaches described herein need not be limited to a Hadamard-based transform, although this is preferred for compatibility with the LCEVC standard. In certain examples, selecting a transform type is performed based on configuration data, e.g. as passed to a command line encoding operation and/or retrieved from an encoding configuration file. Such a selection occurs once at a global configuration level. However, in other examples, such as those described in further detail with reference to FIGS. 10a-e, the input signal is processed to select a transform.

A specific transform can have advantages over other transforms depending on circumstances such as: the input video encoded (for example features in a frame of video), the hardware limitations such as processing power available to the encoder or decoder, the available bitrate, and so forth. Embodiments described herein utilise a certain transform for a particular circumstance by selecting an appropriate transform. In embodiments, the transform can be selected on the fly, for example, an initial transform can be selected for a first scene of a sequence and a second transform type can be selected for a second scene (i.e. after a scene change).

In embodiments, the described low encoding methods, static elements such as logos or text, can be made to be clearer by advantageous selection of a transform.

Some encoders use rate distortion optimisation (RDO) to select a transform (and change transform for each transform block). However, RDO is a computationally expensive process and can take up a (relatively) long time to compute.

In embodiments, using a quick, computationally efficient process to select a transform for the described low complexity enhancement encoding methods helps to improve the enhancement of static elements such as logos and text. Such a process is a calculation of a pixel SAD (sum of absolute differences). This is described in more detail with reference to FIGS. 10a-e. As described elsewhere, the pixel SAD is advantageously used for other purposes.

By way of example, and with reference to the aforementioned LCEVC standard, there are two transformation types (or transform types), namely a directional decomposition (DD) (i.e. a 2×2 transform) and a directional decomposition squared (DDS) (i.e. a 4×4 transform). The transform type is indicated in the bitstream using a transform type signal (transform_type bit in the LCEVC standard). In embodiments, the transform type is selected based on a frame-wide sum of absolute differences pixel for the current frame (which may be obtained by processing based on individual coding unit metrics). The frame-wide metric is compared to a predefined threshold. For example, if the frame-wide metric is below a given threshold, then the transform type will be selected as the DDS 4×4 transform, otherwise the transform type will be selected as the DD 2×2 transform. Alternatively, if the frame-wide metric is above a given threshold, then the transform type will be selected as the DDS 4×4 transform, otherwise the transform type will be selected as the DD 2×2 transform. As discussed, once the transform type has been selected as described in the present embodiments, an indication of the selected transform type is inserted into the bitstream by the encoder. The decoder reading this bitstream will read the bitstream and select the appropriate inverse transform corresponding to the transform type indicated in the bitstream. According to the LCEVC standard, the indication of the transform type is sent as part of a global configuration payload.

Once a transform has been selected, the transform may transform the residual information to four surfaces. For example, the transform may produce the following components: average, vertical, horizontal and diagonal.

In summary, the methods and apparatuses herein are based on an overall approach which is built over an existing encoding and/or decoding algorithm (such as MPEG standards such as AVC/H.264, HEVC/H.265, etc. as well as non-standard algorithm such as VP9, AV1, and others) which works as a baseline for an enhancement layer which works accordingly to a different encoding and/or decoding approach. The idea behind the overall approach of the examples is to hierarchically encode/decode the video frame as opposed to the use block-based approaches as used in the MPEG family of algorithms. Hierarchically encoding a frame includes generating residuals for the full frame, and then a decimated frame and so on.

The video compression residual data for the full-sized video frame may be referred to as LoQ-2 (e.g. 1920×1080 for an HD video frame), while that of the decimated frame may be referred to as LoQ-x, where x denotes a number corresponding to a hierarchical decimation.

In the described examples of FIGS. 1 and 2, the variable x may have values of 1 and 2 represent the first and second enhancement streams. Hence there are 2 hierarchical levels for which compression residuals will be generated. Other naming schemes for the levels may also be applied without any change in functionality (e.g. the level 1 and level 2 enhancement streams described herein may alternatively be referred to as level 1 and level 2 streams—representing a count down from the highest resolution).

Figure 3:
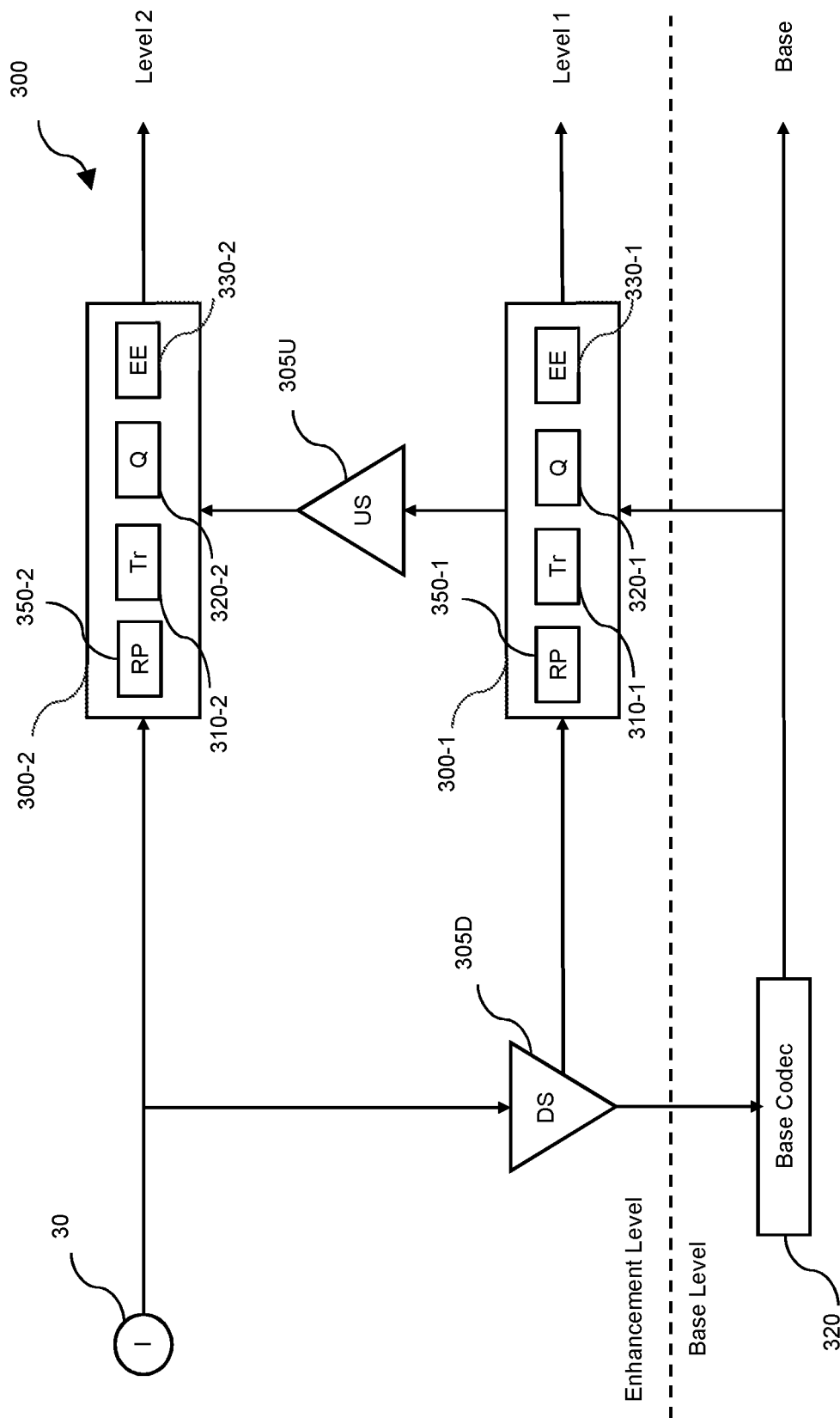
FIG. 3 shows a high-level schematic of an encoding process and specific encoding steps.

A more detailed encoding process is depicted in the block diagram of FIG. 3. The encoding process is split into two halves as shown by the dashed line. Below the dashed line is the base level of an encoder 300, which may usefully be implemented in hardware or software. Above the dashed line is the enhancement level, which may usefully be implemented in software. The encoder 300 may comprise only the enhancement level processes, or a combination of the base level processes and enhancement level processes as needed. The encoder 300 may usefully be implemented in software, especially at the enhancement level. This arrangement allows, for example, a legacy hardware encoder that provides the base level to be upgraded using a firmware (e.g. software) update, where the firmware is configured to provide the enhancement level. In newer devices, both the base level and the enhancement level may be provided in hardware and/or a combination of hardware and software.

The encoder topology at a general level is as follows. The encoder 300 comprises an input I for receiving an input signal 30. The input signal 30 may comprise an input video signal, where the encoder is applied on a frame-by-frame basis. The input I is connected to a down-sampler 305D and processing block 300-2. The down-sampler 305D may correspond to the downsampling component 105 of FIG. 1 and the processing block 300-2 may correspond to the second encoder 121 of FIG. 1, The down-sampler 305D outputs to a base codec 320 at the base level of the encoder 300. The base codec 320 may implement the base encoder 113 and the base decoder 114 of FIG. 1. The down-sampler 305D also outputs to processing block 300-1. The processing block 300-1 may correspond to the first encoder 115 of FIG. 1. Processing block 300-1 passes an output to an up-sampler 305U, which in turn outputs to the processing block 300-2. The upsampler 305U may correspond to the upsampling component 117 of FIG. 1. Each of the processing blocks 300-2 and 300-1 comprise one or more of the following modules: a transform block 310, a quantization block 320, an entropy encoding block 330 and a residual processing block 350. The residual block 350 may occur prior to the transform block 310 and/or control residual processing in the processing blocks 300. The order of processing may be as set out in the Figures.

The input signal 30, such as in this example a full (or highest) resolution video, is processed by the encoder 300 to generate various encoded streams. A base encoded stream is produced by feeding the base codec 320 (e.g., AVC, HEVC, or any other codec) at the base level with a down-sampled version of the input video 30, using the down-sampler 305D. The base encoded stream may comprise the output of a base encoder of the base codec 320. A first encoded stream (an encoded level 1 stream) is created by reconstructing the encoded base stream to create a base reconstruction, and then taking the difference between the base reconstruction and the down-sampled version of the input video 30. Reconstructing the encoded base stream may comprise receiving a decoded base stream from the base codec (i.e. the input to processing block 300-1 comprises a base decoded stream as shown in FIG. 1). The difference signal is then processed at block 300-1 to create the encoded level 1 stream. Block 300-1 comprises a transform block 310-1, a quantization block 320-1 and an entropy encoding block 330-1. A second encoded stream (an encoded level 2 stream) is created by up-sampling a corrected version of the base reconstruction, using the up-sampler 305U, and taking the difference between the corrected version of the base reconstruction and the input signal 30. This difference signal is then processed at block 300-2 to create the encoded level 2 stream. Block 300-2 comprises a transform block 310-2, a quantization block 320-2, an entropy encoding block 330-2 and a residual processing block 350-2. As per processing block 300-1, the blocks may be performed in the order shown in the Figures (e.g. residual processing followed by transformation followed by quantization followed by entropy encoding).

Any known quantization scheme may be useful to create the residual signals into quanta, so that certain variables can assume only certain discrete magnitudes. In one case quantizing comprises actioning a division by a pre-determined step-width. This may be applied at both levels (1 and 2). For example, quantizing at block 320 may comprise dividing transformed residual values by a step-width. The step-width may be pre-determined, e.g. selected based on a desired level of quantization. In one case, division by a step-width may be converted to a multiplication by an inverse step-width, which may be more efficiently implemented in hardware. In this case, de-quantizing, such as at block 320, may comprise multiplying by the step-width. Entropy encoding as described herein may comprise run length encoding (RLE), then processing the encoded output is processed using a Huffman encoder. In certain cases, only one of these schemes may be used when entropy encoding is desirable.

The encoded base stream may be referred to as the base level stream.

FIG. 3 illustrates the residual processing blocks 350-2, 350-1 which are located prior to transformation block 310. Although residual processing is shown prior to transformation, optionally, the processing step may be arranged elsewhere, for example, later in the encoding process; however, when being located before the transformation step, residual processing may have the biggest impact throughout the encoding pipeline as efficiencies are propagated through the pipeline. For example, if residual values are filtered at an early stage (e.g. by setting to 0), then this reduces an amount of computation that needs to be performed at subsequent stages within the processing blocks 300. The residual processing block 350 may be activated or configured by residual mode selection block 140 (not shown in FIG. 3, shown in FIG. 1). For example, if a residual mode is selected (e.g. turned on), then the residual processing block 350 may be activated. The residual mode may be selected independently for the first and second enhancement streams (e.g. residual processing blocks 350-2 and 350-1 may be activated and applied separately where one may be off while another is on).

The residual processing block is configured to modify a set of residuals. Certain specific functionality of the residual processing block 310 is described in detail below however, conceptually, the residual processing block 310 functions to modify the residuals. This may be seen as a form of filtering or pre-processing. In certain examples, the residuals may be ranked or given a priority as part of the filtering or pre-processing, whereby those with a higher rank or priority are passed for further processing while those with a lower rank or priority are not passed for further processing (e.g. are set to 0 or a corresponding low value). In effect, the residual processing block is configured to 'kill' one or more residuals prior to transformation such that transformation operates on a subset of the residuals.

The residual processing block 310 may be the same in the L2 and L1 pathways or may be configured differently (or not included in a particular pathway) so as to reflect the different nature of those streams.

Certain examples may implement different residual processing modes. A residual mode selection block 140 may indicate whether or not residuals are to be processed and also, in certain embodiments, the type of processing performed. In general, an encoder (such as the low complexity encoder of FIG. 1 or the encoder 300 of FIG. 3) may comprise a residual mode control component 140 that selects and implements a residual mode and residual mode implementation components that implements processing for a selected residual mode in relation to the one or more enhancement streams. In other cases, only residual processing blocks 350 may be provided within each level of enhancement encoding without higher control functionality (e.g. within higher level control component such as control component 140). In this latter case, the functionality of the residual mode control component 140 may be seen to be incorporated into the first and/or second encoders 115 and 121 of FIG. 1.

Examples of residual modes that may be implemented include, but are not limited to a mode where no residual processing is performed, a binary mode whereby certain residuals are multiplied by 0 or 1, a weighting mode whereby residuals are multiplied by a weighting factor, a control mode whereby certain blocks or coding units are not to be processed (e.g. equivalent to setting all residual values in a 2×2 or 4×4 coding unit to 0), a ranking or priority mode whereby residuals are ranked or given a priority within a list and selected for further processing based on the rank or priority, a scoring mode whereby residuals are given a score that is used to configure residual encoding and a categorization mode whereby residuals and/or picture elements are categorised and corresponding residuals are modified or filtered based on the categorization.

As indicated herein, once the residuals have been computed (e.g. by comparators 110 and/or 119 in FIG. 1), the residuals may be processed to decide how the residuals are to be encoded and transmitted. As described earlier, residuals are computed by comparing an original form of an image signal with a reconstructed form of an image signal. For example, in one case, residuals for an L−2 enhancement stream are determined by subtracting an output of the upsampling from an original form of an image signal (e.g. the input video as indicated in the Figures). The input to the upsampling may be said to be a reconstruction of a signal following a simulated decoding. In another case, residuals for an L−1 enhancement stream are determined by subtracting an image stream output by the base decoder from a downsampled form of the original image signal (e.g. the output of the downsampling).

To process residuals, e.g. in a selected residual mode, the residuals may be categorized. For example, residuals may be categorized in order to select a residual mode and/or to selectively apply pre-processing within a particular mode. A categorization process of the residuals may be performed based, for example, on certain spatial and/or temporal characteristic of the input image. This is indicated in FIG. 1 by the input to the residual mode selection component 140 from the input video 100. In other examples, the input may come from other signals within the encoder including the down-sampled video and/or the residuals themselves.

In one example, the input image is processed to determine, for each element (e.g., a pixel or an area including multiple pixels) and/or group of elements (e.g. a coding unit comprising a 2×2 or 4×4 area of pixels or a tile comprising a set of coding units) whether that element and/or group of elements has certain spatial and/or temporal characteristics. In one case, a pixel metric, such as a SAD metric is computed for groups of elements (e.g. for 2×2 coding units of one or more input video frames). In examples that are further described below, this pixel metric may be compared to one or more thresholds in order to control residual processing based on spatial and/or temporal characteristics represented by the pixel metric. Spatial characteristics may include the level of spatial activity between specific elements or groups of elements (e.g., how many changes exists between neighbouring elements), or a level of contrast between specific elements and/or between groups of elements (e.g., how much a group of element differs from one or more other groups of elements). In one case, a contrast metric may be computed for a frame of video at one or more resolutions and this may be used as a basis for categorisation. This contrast metric may be determined at a per picture element level (e.g. corresponding to a per residual element level) and/or at a group level (e.g. corresponding to tiles, coding units or blocks of residuals). The spatial characteristics may be a measure of a change in a set of spatial directions (e.g. horizontal and/or vertical directions for a 2D planar image). Temporal characteristics may include temporal activity for a specific element and/or group of elements (e.g., how much an element and/or a group of elements differ between collocated elements and/or group of elements on one or more previous and/or future frames). The temporal characteristics may be a measure of a change in a temporal direction (e.g. along a time series). The characteristics may be determined per element and/or element group; this may be per pixel and/or per 2×2 or 4×4 residual block and/or per tile (e.g. group of residual blocks). In a further embodiment, a level of texture or detail may be used (e.g. how much detail is represented by an element or group of elements). A texture metric, indicating a level of texture or detail may be determined in a similar manner to the contrast metric. Metrics as described here may be normalised such that they are represented within a predefined range, such as 0 to 1 or 0% to 100% or 0 to 255 (i.e. 8 bit integers). A tile may comprise a 16×16 set of picture elements or residuals (e.g. an 8 by 8 set of 2×2 coding units or a 4 by 4 set of 4×4 coding units).

These spatial and/or temporal characteristics may be combined and/or weighted to determine a complex measure of a group of elements. In certain cases, the complex measure or other metrics described herein may be determined prior to encoding (e.g. at an initial processing stage for a video file) and retrieved at the encoding stage to apply the residual processing. Similarly, the metrics may be computed periodically, for example for a group of frames or planes. Further, multiple different metrics may be stored and used for different sets of residuals, for example, a different metric may be pre-computed for each plane of a frame and used in a subsequent comparison for that plane of residuals.

Note temporal characteristics are important for example because when a group of elements is static, it may be easier for viewers to spot tiny details, and therefore it may be important to preserve residual information, e.g. a priority of certain static residual elements may be higher than a comparative set of transient residual elements. Also sources of noise in an original video recording at higher resolutions (e.g. an L−2 enhancement stream) may lead to many small yet transient residual values (e.g. normally distributed values of −2 or −1 or 1 or 2)—these may be given a lower priority and/or set to 0 prior to residual processing in the enhancement level encoders.

The categorization may associate a respective weight to each element and/or group of elements based on the spatial and/or temporal characteristics of the element and/or group of elements. The weight may be a normalized value between 0 and 1.

In one residual mode, a decision may be made as to whether to encode and transmit a given set of residuals. For example, in one residual mode, certain residuals (and/or residual blocks—such as the 2×2 or 4×4 blocks described herein) may be selectively forwarded along the L−2 or L−1 enhancement processing pipelines by the ranking components and/or the selection components. Put another way, different residual modes may have different residual processing in the L−2 and L−1 encoding components in FIG. 1. For example, in one residual mode, certain residuals may not be forwarded for further L−2 or L−1 encoding, e.g. may not be transformed, quantized and entropy encoded. In one case, certain residuals may not be forwarded by setting the residual value to 0 and/or by setting a particular control flag relating to the residual or a group that includes the residual. Control flags will be discussed in more detail below.

In one residual mode, a binary weight of 0 or 1 may be applied to residuals, e.g. by the components discussed above. This may correspond to a mode where selective residual processing is "on". In this mode, a weight of 0 may correspond to "ignoring" certain residuals, e.g. not forwarding them for further processing in an enhancement pipeline. In another residual mode, there may be no weighting (or the weight may be set to 1 for all residuals); this may correspond to a mode where selective residual processing is "off". In yet another residual mode, a normalised weight of 0 to 1 may be applied to a residual or group of residuals. This may indicate an importance or "usefulness" weight for reconstructing a video signal at the decoder, e.g. where 1 indicates that the residual has a normal use and values below 1 reduce the importance of the residual. In other cases, the normalised weight may be in another range, e.g. a range of 0 to 2 may give prominence to certain residuals that have a weight greater than 1.

In the residual modes described above, the residual and/or group of residuals may be multiplied by an assigned weight, where the weight may be assigned following a categorization process applied to a set of corresponding elements and/or groups of elements. For example, in one case, each element or group of elements may be assigned a class represented by an integer value selected from a predefined set or range of integers (e.g. 10 classes from 0 to 9). Each class may then have a corresponding weight value (e.g. 0 for class 0, 0.1 for class 1 or some other non-linear mapping). The relationship between class and weight value may be determined by analysis and/or experimentation, e.g. based on picture quality measurements at a decoder and/or within the encoder. The weight may then be used to multiply a corresponding residual and/or group of residuals, e.g. a residual and/or group of residuals that correspond to the element and/or group of elements. In one case, this correspondence may be spatial, e.g. a residual is computed based on a particular input element value and the categorisation is applied to the particular input element value to determine the weight for the residual. In other words, the categorization may be performed over the elements and/or group of elements of the input image, where the input image may be a frame of a video signal, but then the weights determined from this categorization are used to weight co-located residuals and/or group of residuals rather than the elements and/or group of elements. In this way, the characterization may be performed as a separate process from the encoding process, and therefore it can be computed in parallel to the encoding of the residuals process.

To identify the appropriate residuals to modify, the process may analyse the set of residuals and identify characteristics or patterns. Alternatively, the process may analyse the original input signal corresponding to that set of residuals. Further, the process may predict an effect on a reconstructed image by that set of residuals (or the set as modified). The prediction may include reconstructing the image by combining the residuals with the signal from a lower level, analysing the reconstructed signal and processing the residuals accordingly or iteratively.

It was described above how certain residuals may not be forwarded by setting the residual value to 0 and/or by setting a particular control flag relating to the residual or a group that includes the residual. In the latter case, a set of flags or binary identifiers may be used, each corresponding to an element or group of elements of the residuals. Each residual may be compared to the set of flags and prevented from being transformed based on the flags. In this way the residuals processing may be non-destructive. Alternatively the residuals may be deleted based on the flags. The set of flags is further advantageous as it may be used repeatedly for residuals or groups of residuals without having to process each set or residual independently and can be used as a reference. For example, each frame may have a binary bitmap that acts a mask to indicate whether a residual is to be processed and encoded. In this case, only residuals that have a corresponding mask value of 1 may be encoded and residuals that have a corresponding mask value of 0 may be collectively set to 0.

In a ranking and filtering mode, the set of residuals may be assigned a priority or rank, which is then compared to a threshold to determine which residuals should be de-selected or 'killed'. The threshold may be predetermined or may be variable according to a desired picture quality, transmission rate or computing efficiency. For example, the priority or rank may be a value within a given range of values e.g. floating point values between 0 to 1 or integer values between 0 and 255. The higher end of the range (e.g. 1 or 255) may indicate a highest rank or priority. In this case, a threshold may be set as a value within the range. In a comparison, residuals with corresponding rank or priority values below the threshold may be de-selected (e.g. set to 0).

Figure 4:
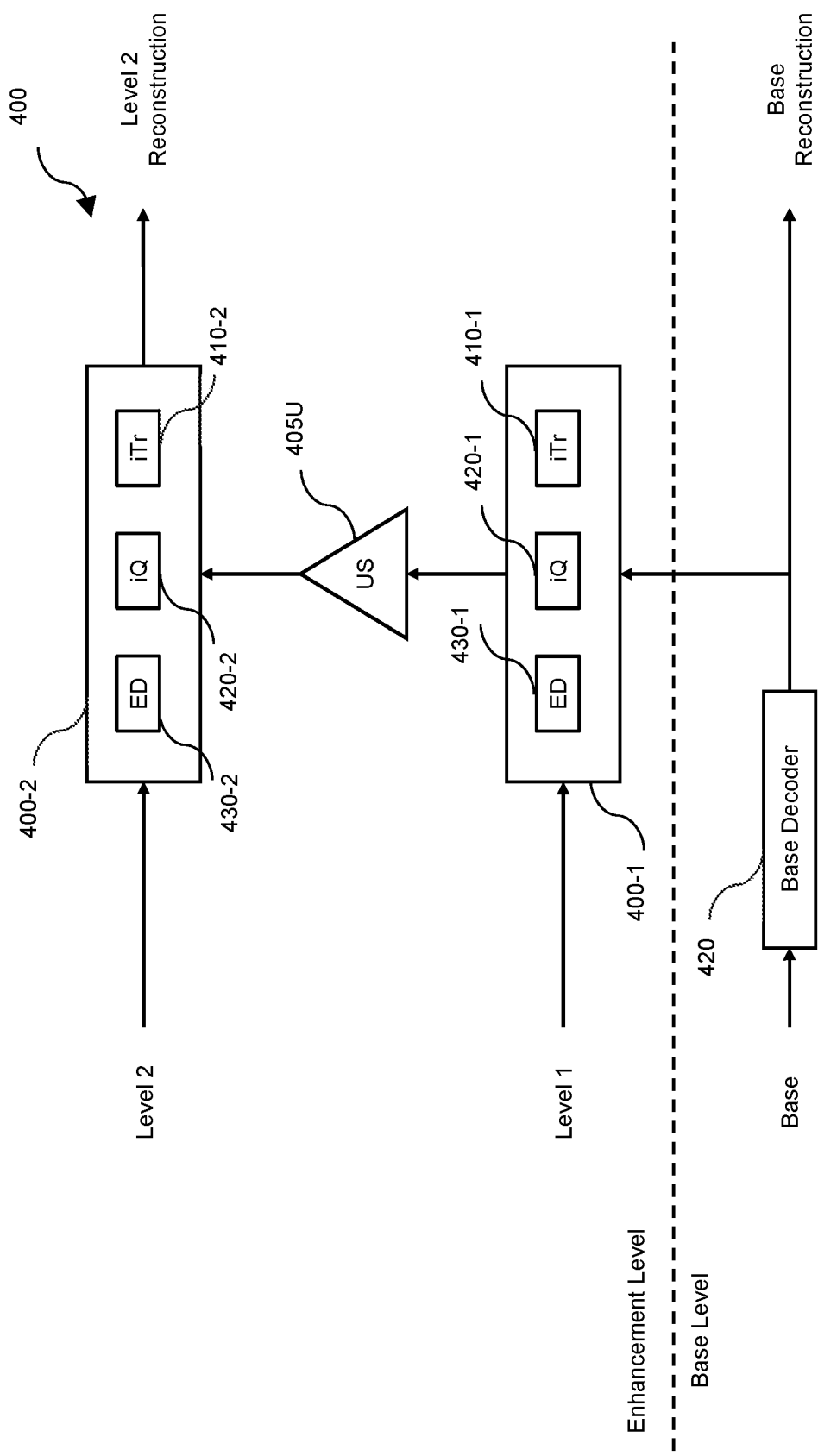
FIG. 4 shows a high-level schematic of a decoding process and specific decoding steps.

A decoder 400 that performs a decoding process corresponding to the encoder of FIG. 3 is depicted in the block diagram of FIG. 4. The decoding process is split into two halves as shown by the dashed line. Below the dashed line is the base level of the decoder 400, which may usefully be implemented in hardware. Above the dashed line is the enhancement level, which may usefully be implemented in software. The decoder 400 may comprise only the enhancement level processes, or a combination of the base level processes and enhancement level processes as needed. The decoder 400 may usefully be implemented in software, especially at the enhancement level, and may suitably sit over legacy decoding technology, particularly legacy hardware technology. By legacy technology, it is meant older technology previously developed and sold which is already in the marketplace, and which would be inconvenient and/or expensive to replace, and which may still serve a purpose for decoding signals. In other cases, the base level may comprise any existing and/or future video encoding tool or technology.

The decoder topology at a general level is as follows. The decoder 400 comprises an input (not shown) for receiving one or more input signals comprising the encoded base stream, the encoded level 1 stream, and the encoded level 2 stream together with optional headers containing further decoding information. The decoder 400 comprises a base decoder 420 at the base level, and processing blocks 400-1 and 400-2 at the enhancement level. An up-sampler 405U is also provided between the processing blocks 400-1 and 400-2 to provide processing block 400-2 with an up-sampled version of a signal output by processing block 400-1. The base decoder 420 may correspond to the base decoder 210 of FIG. 2, the processing block 400-1 may correspond to the first decoder 211 of FIG. 2, the processing block 400-2 may correspond to the second decoder 214 of FIG. 2 and the upsampler 405U may correspond to the upsampler 213 of FIG. 2.

The decoder 400 receives the one or more input signals and directs the three streams generated by the encoder 300. The encoded base stream is directed to and decoded by the base decoder 420, which corresponds to the base codec 420 used in the encoder 300, and which acts to reverse the encoding process at the base level. The encoded level 1 stream is processed by block 400-1 of decoder 400 to recreate the first set of residuals created by encoder 300. Block 400-1 corresponds to the processing block 300-1 in encoder 300, and at a basic level acts to reverse or substantially reverse the processing of block 300-1. The output of the base decoder 420 is combined with the first set of residuals obtained from the encoded level 1 stream. The combined signal is up-sampled by up-sampler 405U. The encoded level 2 stream is processed by block 400-2 to recreate the further residuals created by the encoder 300. Block 400-2 corresponds to the processing block 300-2 of the encoder 300, and at a basic level acts to reverse or substantially reverse the processing of block 300-2. The up-sampled signal from up-sampler 405U is combined with the further residuals obtained from the encoded level 2 stream to create a level 2 reconstruction of the input signal 30. The output of the processing block 400-2 may be seen as decoded video similar to the decoded video 250 of FIG. 2.

As noted above, the enhancement stream may comprise two streams, namely the encoded level 1 stream (a first level of enhancement) and the encoded level 2 stream (a second level of enhancement). The encoded level 1 stream provides a set of correction data which can be combined with a decoded version of the base stream to generate a corrected picture.

Figure 5:
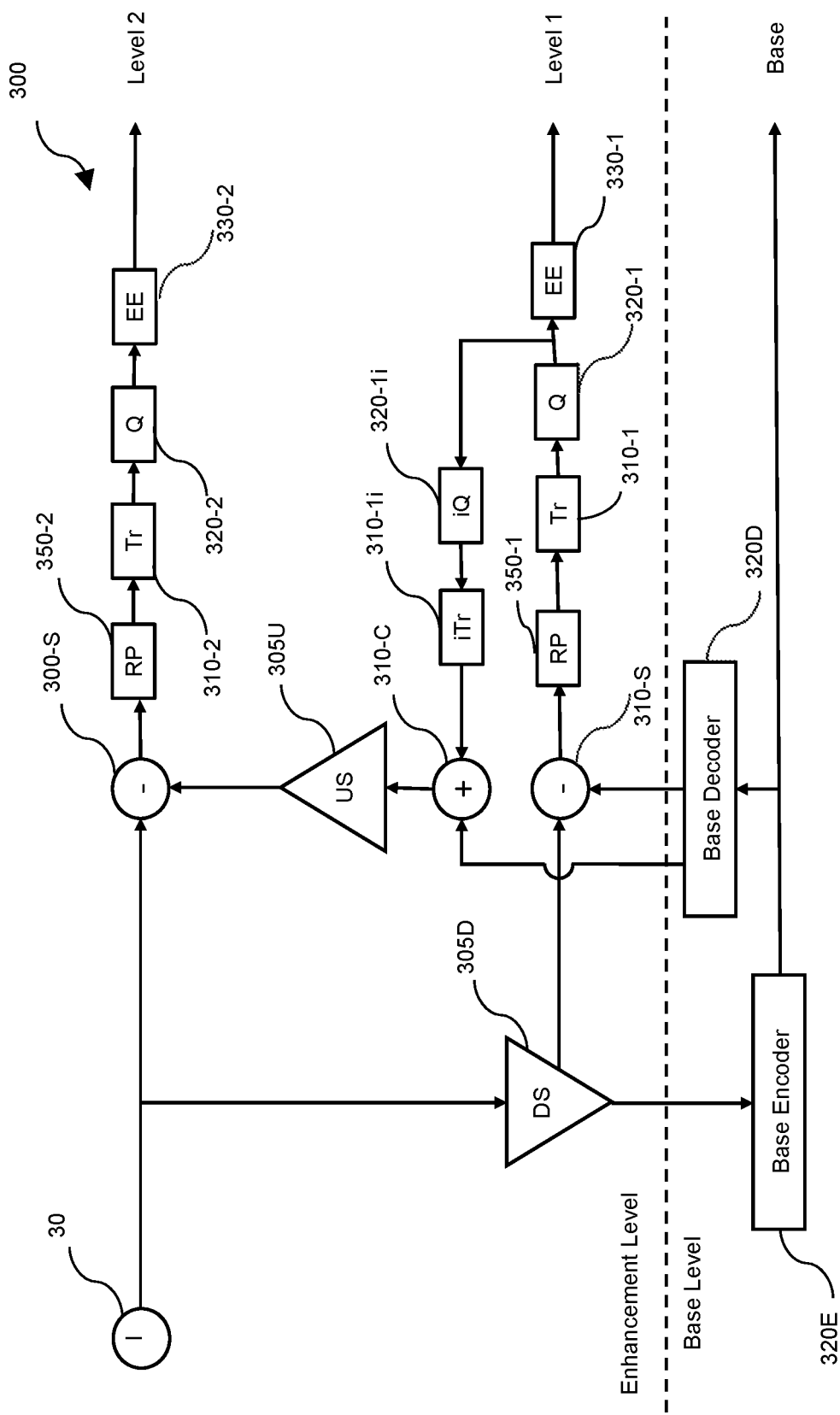
FIG. 5 shows a high-level schematic of an encoding process and residual processing.

FIG. 5 shows the encoder 300 of FIG. 1 in more detail. The encoded base stream is created directly by the base encoder 320E, and may be quantized and entropy encoded as necessary. In certain cases, these latter processes may be performed as part of the encoding by the base encoder 320E. To generate the encoded level 1 stream, the encoded base stream is decoded at the encoder 300 (i.e. a decoding operation is applied at base decoding block 320D to the encoded base stream). The base decoding block 320D is shown as part of the base level of the encoder 300 and is shown separate from the corresponding base encoding block 320E. For example, the base decoder 320D may be a decoding component that complements an encoding component in the form of the base encoder 320E with a base codec. In other examples, the base decoding block 320D may instead be part of the enhancement level and in particular may be part of processing block 300-1.

Returning to FIG. 5, a difference between the decoded base stream output from the base decoding block 320D and the down-sampled input video is created (i.e. a subtraction operation 310-S is applied to the down-sampled input video and the decoded base stream to generate a first set of residuals). Here the term residuals is used in the same manner as that known in the art; that is, residuals represent the error or differences between a reference signal or frame and a desired signal or frame. Here the reference signal or frame is the decoded base stream and the desired signal or frame is the down-sampled input video. Thus the residuals used in the first enhancement level can be considered as a correction signal as they are able to 'correct' a future decoded base stream to be the or a closer approximation of the down-sampled input video that was used in the base encoding operation. This is useful as this can correct for quirks or other peculiarities of the base codec. These include, amongst others, motion compensation algorithms applied by the base codec, quantization and entropy encoding applied by the base codec, and block adjustments applied by the base codec.

The components of block 300-1 in FIG. 3 are shown in more detail in FIG. 5. In particular, the first set of residuals are transformed, quantized and entropy encoded to produce the encoded level 1 stream. In FIG. 5, a transform operation 310-1 is applied to the first set of residuals; a quantization operation 320-1 is applied to the transformed set of residuals to generate a set of quantized residuals; and, an entropy encoding operation 330-1 is applied to the quantized set of residuals to generate the encoded level 1 stream at the first level of enhancement. However, it should be noted that in other examples only the quantization step 320-1 may be performed, or only the transform step 310-1. Entropy encoding may not be used, or may optionally be used in addition to one or both of the transform step 110-1 and quantization step 320-1. The entropy encoding operation can be any suitable type of entropy encoding, such as a Huffmann encoding operation or a run-length encoding (RLE) operation, or a combination of both a Huffmann encoding operation and a RLE operation. A residuals processing operation 350-2, 350-1 may be provided in certain embodiments prior to either transform operation 310-2, 310-1 or both. The residual processing operation 350 applies residual pre-processing as described herein, e.g. filtering the residuals received by the block so as to only pass a subset of the received residuals onto the transform operation 310 (or in other words to set certain residual values to zero such that the original values are not processed within the subsequent operations of the pipeline). In certain cases, described below, the transform operations 310 and the residual processing operations 350 may be combined in a single block, e.g. where modifying residuals comprises selecting different transform types as well as, or instead of, setting certain residual values to 0.

As noted above, the enhancement stream may comprise the encoded level 1 stream (the first level of enhancement) and the encoded level 2 stream (the second level of enhancement). The first level of enhancement may be considered to enable a corrected video at a base level, that is, for example to correct for encoder and/or decoder artefacts. The second level of enhancement may be considered to be a further level of enhancement that is usable to convert the corrected video to the original input video or a close approximation thereto (e.g. to add detail or sharpness). For example, the second level of enhancement may add fine detail that is lost during the downsampling and/or help correct from errors that are introduced by one or more of the transform operation 310-1 and the quantization operation 320-1.

Referring to FIG. 3 and FIG. 5, to generate the encoded level 2 stream, a further level of enhancement information is created by producing and encoding a further set of residuals at block 300-2. The further set of residuals are the difference between an up-sampled version (via up-sampler 305U) of a corrected version of the decoded base stream (the reference signal or frame), and the input signal 30 (the desired signal or frame).

To achieve a reconstruction of the corrected version of the decoded base stream as would be generated at the decoder 400, at least some of the processing steps of block 300-1 are reversed to mimic the processes of the decoder 200, and to account for at least some losses and quirks of the transform and quantization processes. To this end, block 300-1 comprises an inverse quantize block 320-1*i* and an inverse transform block 310-1*i*. The quantized first set of residuals are inversely quantized at inverse quantize block 320-1*i* and are inversely transformed at inverse transform block 310-1*i* in the encoder 100 to regenerate a decoder-side version of the first set of residuals.

The decoded base stream from decoder 320D is combined with this improved decoder-side version of the first set of residuals (i.e. a summing operation 310-C is performed on the decoded base stream and the decoder-side version of the first set of residuals). Summing operation 310-C generates a reconstruction of the down-sampled version of the input video as would be generated in all likelihood at the decoder—i.e. a reconstructed base codec video). As illustrated in FIG. 3 and FIG. 5, the reconstructed base codec video is then up-sampled by up-sampler 305U.

The up-sampled signal (i.e. reference signal or frame) is then compared to the input signal 30 (i.e. desired signal or frame) to create a second set of residuals (i.e. a difference operation 300-S is applied to the up-sampled re-created stream to generate a further set of residuals). The second set of residuals are then processed at block 300-2 to become the encoded level 2 stream (i.e. an encoding operation is then applied to the further or second set of residuals to generate the encoded further or second enhancement stream).

In particular, the second set of residuals are transformed (i.e. a transform operation 310-2 is performed on the further set of residuals to generate a further transformed set of residuals). The transformed residuals are then quantized and entropy encoded in the manner described above in relation to the first set of residuals (i.e. a quantization operation 320-2 is applied to the transformed set of residuals to generate a further set of quantized residuals; and, an entropy encoding operation 320-2 is applied to the quantized further set of residuals to generate the encoded level 2 stream containing the further level of enhancement information). However, only the quantization step 20-1 may be performed, or only the transform and quantization step. Entropy encoding may optionally be used in addition. Preferably, the entropy encoding operation may be a Huffmann encoding operation or a run-length encoding (RLE) operation, or both. Similar to block 300-1, the residual processing operation 350-2 acts to pre-process, i.e. filter, residuals prior to the encoding operations of this block.

Thus, as illustrated in FIGS. 3 and 5 and described above, the output of the encoding process is a base stream at a base level, and one or more enhancement streams at an enhancement level which preferably comprises a first level of enhancement and a further level of enhancement. As discussed with reference to previous examples, the operations of FIG. 5 may be applied in parallel to coding units or blocks of a colour component of a frame as there are no inter-block dependencies. The encoding of each colour component within a set of colour components may also be performed in parallel (e.g. such that the operations of FIG. 5 are duplicated according to (number of frames)*(number of colour components)*(number of coding units per frame)). It should also be noted that different colour components may have a different number of coding units per frame, e.g. a luma (e.g. Y) component may be processed at a higher resolution than a set of chroma (e.g. U or V) components as human vision may detect lightness changes more than colour changes.

Figure 6:
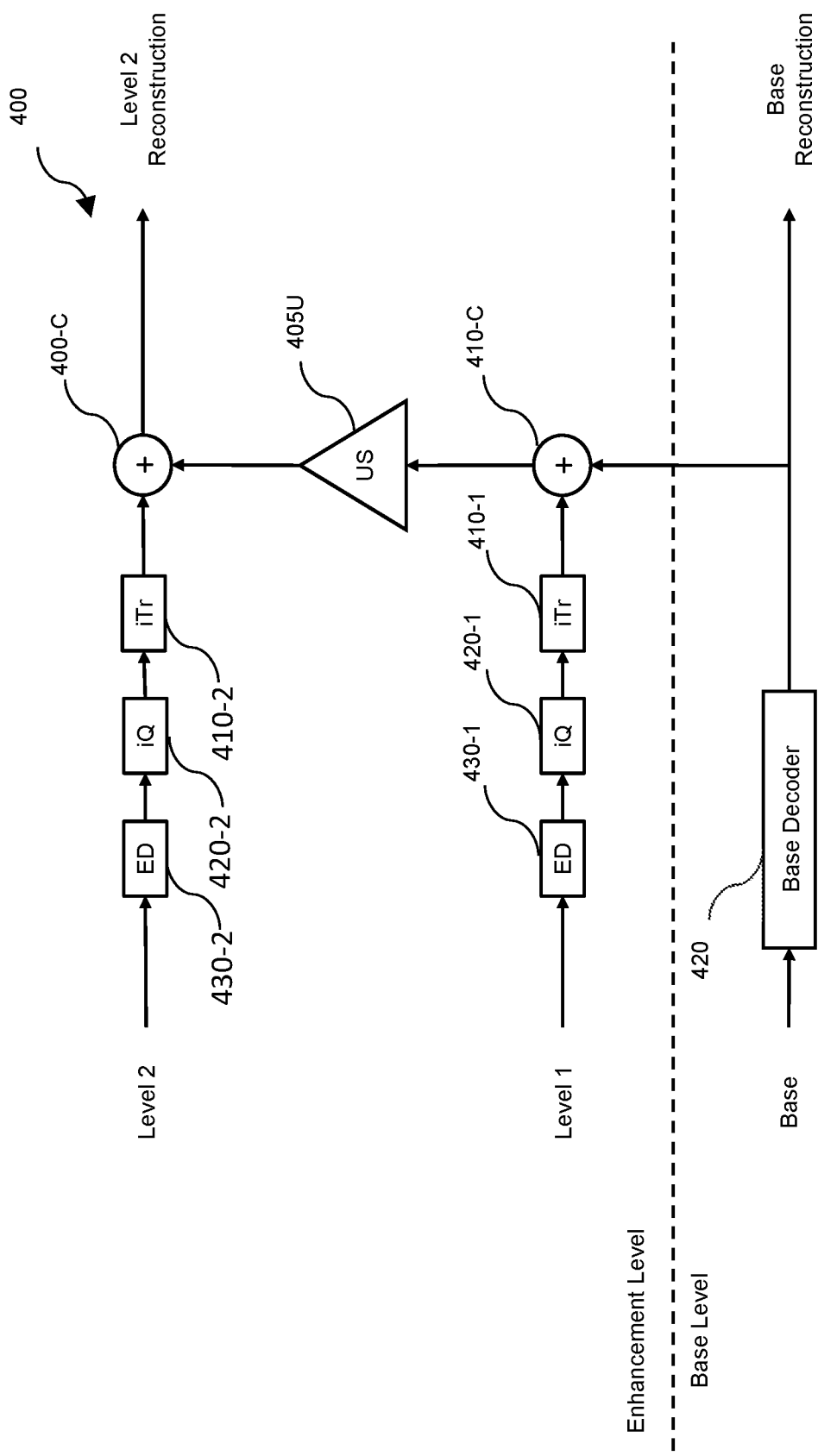
FIG. 6 shows a high-level schematic of a further decoding process.

The encoded base stream and one or more enhancement streams are received at the decoder 400. FIG. 6 shows the decoder of FIG. 4 in more detail.

The encoded base stream is decoded at base decoder 420 in order to produce a base reconstruction of the input signal 30 received at encoder 300. This base reconstruction may be used in practice to provide a viewable rendition of the signal 30 at the lower quality level. However, the primary purpose of this base reconstruction signal is to provide a base for a higher quality rendition of the input signal 30. To this end, the decoded base stream is provided to processing block 400-1. Processing block 400-1 also receives encoded level 1 stream and reverses any encoding, quantization and transforming that has been applied by the encoder 300. Block 400-1 comprises an entropy decoding process 430-1, an inverse quantization process 420-1, and an inverse transform process 410-1. Optionally, only one or more of these steps may be performed depending on the operations carried out at corresponding block 300-1 at the encoder. By performing these corresponding steps, a decoded level 1 stream comprising the first set of residuals is made available at the decoder 400. The first set of residuals is combined with the decoded base stream from base decoder 420 (i.e. a summing operation 410-C is performed on a decoded base stream and the decoded first set of residuals to generate a reconstruction of the down-sampled version of the input video—i.e. the reconstructed base codec video). As illustrated in FIG. 4 and FIG. 6, the reconstructed base codec video is then up-sampled by up-sampler 405U.

Additionally, and optionally in parallel, the encoded level 2 stream is processed at block 400-2 of FIG. 2 in order to produce a decoded further set of residuals. Similarly to processing block 300-2, processing block 400-2 comprises an entropy decoding process 430-2, an inverse quantization process 420-2 and an inverse transform process 410-2. Of course, these operations will correspond to those performed at block 300-2 in encoder 300, and one or more of these steps may be omitted as necessary. Block 400-2 produces a decoded level 2 stream comprising the further set of residuals and these are summed at operation 400-C with the output from the up-sampler 405U in order to create a level 2 reconstruction of the input signal 30. The level 2 reconstruction may be viewed as an output decoded video such as 250 in FIG. 2. In certain examples, it may also be possible to obtain and view the reconstructed video that is passed to the upsampler 405U—this will have a first level of enhancement but may be at a lower resolution than the level 2 reconstruction.

Thus, as illustrated and described above, the output of the decoding process is an (optional) base reconstruction, and an original signal reconstruction at a higher level. This example is particularly well-suited to creating encoded and decoded video at different frame resolutions. For example, the input signal 30 may be an HD video signal comprising frames at 1920×1080 resolution. In certain cases, the base reconstruction and the level 2 reconstruction may both be used by a display device. For example, in cases of network traffic, the level 2 stream may be disrupted more than the level 1 and base streams (as it may contain up to 4× the amount of data where downsampling reduces the dimensionality in each direction by 2). In this case, when traffic occurs the display device may revert to displaying the base reconstruction while the level 2 stream is disrupted (e.g. while a level 2 reconstruction is unavailable), and then return to displaying the level 2 reconstruction when network conditions improve. A similar approach may be applied when a decoding device suffers from resource constraints, e.g. a set-top box performing a systems update may have an operation base decoder 220 to output the base reconstruction but may not have processing capacity to compute the level 2 reconstruction.

The encoding arrangement also enables video distributors to distribute video to a set of heterogeneous devices; those with just a base decoder 220 view the base reconstruction, whereas those with the enhancement level may view a higher-quality level 2 reconstruction. In comparative cases, two full video streams at separate resolutions were required to service both sets of devices. As the level 2 and level 1 enhancement streams encode residual data, the level 2 and level 1 enhancement streams may be more efficiently encoded, e.g. distributions of residual data typically have much of their mass around 0 (i.e. where there is no difference) and typically take on a small range of values about 0. This may be particularly the case following quantization. In contrast, full video streams at different resolutions will have different distributions with a non-zero mean or median that require a higher bit rate for transmission to the decoder.

As is seen by the examples of FIGS. 4 and 6, the residual modes may be applied at the encoder and the decoder may not require any additional residual processing. However, when residual processing is applied at the encoder, the level 1 and/or level 2 enhancement streams that are received at the decoder may differ from a comparative case wherein residual processing is not applied at the encoder. For example, when residual processing is applied, e.g. as per any of the examples described herein, the level 1 and/or level 2 enhancement streams will typically contain a greater number of 0 values that may be more efficiently compressed by the entropy encoding stages.

Figure 7:
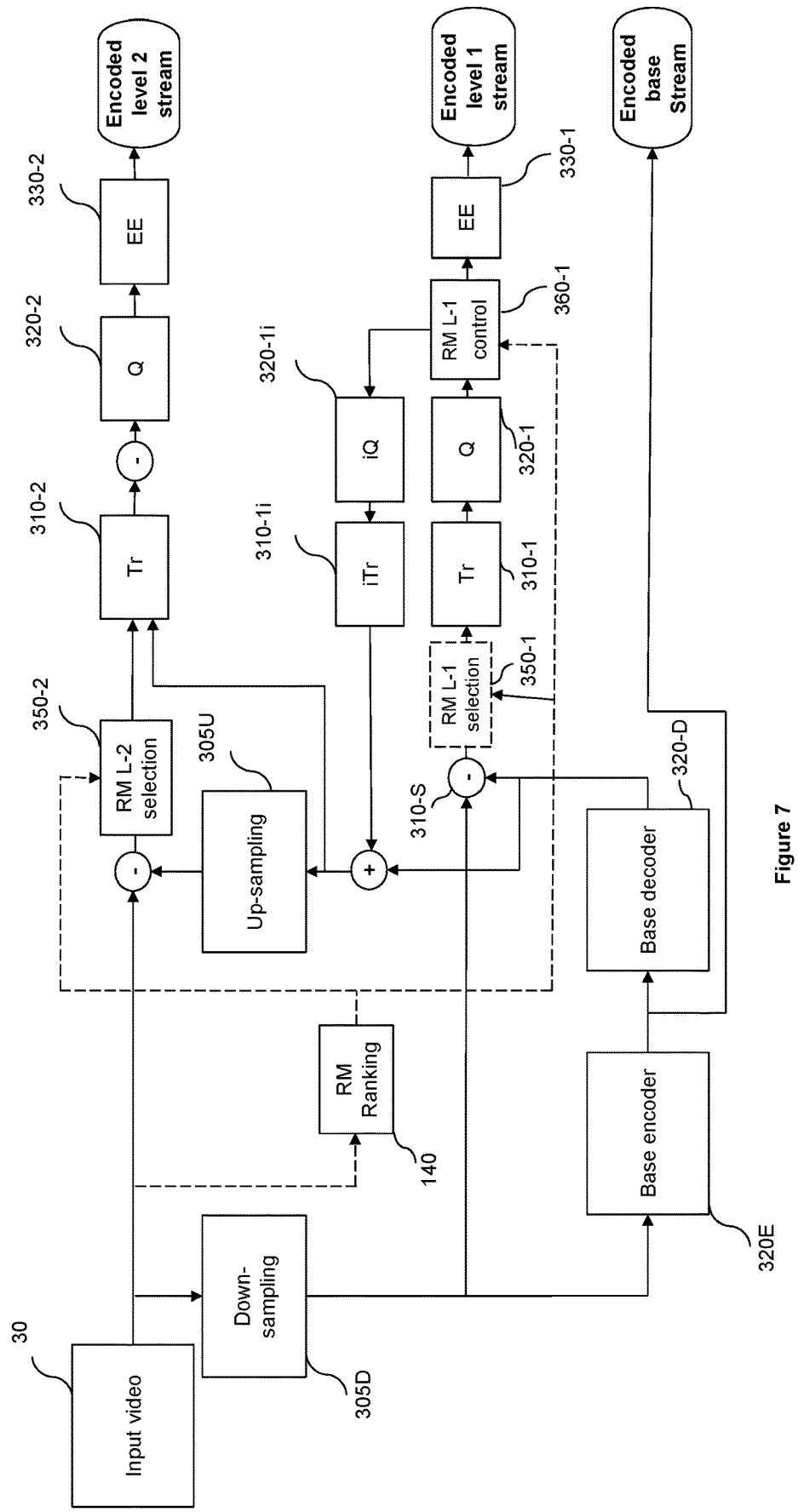
FIG. 7 shows a high-level schematic of an encoding process and residual mode control.

FIG. 7 illustrates an implementation example of the encoding process described above and illustrated. As is clearly identifiable, the encoding and decoding steps of the stream and expanded in detail.

In general, the steps include a residuals filtering mode step, a transform step, a quantization step and an entropy encoding step. The encoding process identifies if the residuals filtering mode is selected. The residual filtering mode may comprise a form of residual ranking. At a lowest level the ranking may be binary, e.g. residuals are ranked as either 0 or 1, if residuals are ranked at 0 they may not be selected for further processing; only residuals ranked 1 may be passed for further processing. In other cases, the ranking may be based on a greater number of levels. If residuals mode is selected the residuals filtering step may be performed (e.g. a residuals ranking operation may be performed on the first step of residuals to generate a ranked set of residuals). The ranked set of residuals may be filtered so that not all residuals are encoded into the first enhancement stream (or correction stream). In certain cases, the steps of ranking and filtering may be combined into a single step, i.e. some residual values are filtered out whereas other residuals values are passed for encoding.

In the example of FIG. 7, if a residual mode is applied such that residual values are processed prior to encoding within one or more enhancement levels, the result of the residual processing (e.g. a modified set of residuals) is then transformed, quantized and entropy encoded to produce the encoded level 1 or level 2 streams. If a residual mode is not selected, then residual values may be passed through the residual processing component for transformation, quantization and entropy encoding.

As noted above, generally it is preferred to or otherwise not encode, residuals rather than transformed coefficients. This is because processing the residuals at an early stage, e.g. by filtering the residuals based on a rank or other categorisation, means that values may be set to 0 to simplify the computations in the later more computationally expensive stages. Moreover, in certain cases, a residual mode may be set at a block or tile level. In this case, residual pro-processing (i.e. a residual mode) may be selected for all residual values corresponding to a particular coding unit or for a particular group of coding units. As there is no inter-block dependency, it does not matter if certain residual values are pre-processed whereas other residual values are not pre-processed. Being able to select a residual mode at a block or tile level enhances the flexibility of the proposed encoding scheme.

It is further contemplated that in addition to, or instead of, modifying residuals the quantization parameters of a subsequent quantization step may be modified. In a particular example, depending on the threshold at which the residuals are prevented from being transformed, the deadzone of a quantizer may be modified. A deadzone is an area of a spectrum in which no values are encoded. This deadzone may correspond to a distance from the threshold or may be a multiplier (e.g. of a step width). In a further example, the step widths of the quantizer may be modified based on the processing.

Similarly, a feedback mechanism from the quantization operation may affect the residuals processing operation. For example, if a transform coefficient would not be quantized or quantized to zero then the residual on which the transform coefficient is based need not be transformed and can be de-selected.

In a further example a 'pre-quantization' operation may be performed in which a first stage of quantization is performed on the residuals (e.g. in addition and before the quantize operation 320 shown in the Figures). The modification of residuals may comprise the 'pre-quantization' or further modification may be performed on the (pre-)quantized residuals. A further quantize operation may be performed after modification of the residuals at the block 320. In certain cases, the 'pre-quantization' may also comprise applying a deadzone, and the deadzone may be configurable based on a quantization step width (e.g. as determined for a given residual element and/or group of residual elements). More detail on pre-quantization will be provided below in the context of FIG. 11.

FIG. 7 illustrates a residual mode control block 360-1 that may be used to apply a residual mode at one or more later stages in an encoding pipeline. Here residual mode control is shown only in the L1 pathway but it may also be configured in the L2 pathway. The residual mode control block 360-1 is positioned preferably between the quantization 320-1 and entropy coding 330-1 blocks. In this case, residual values may be categorised, ranked and/or assigned a score at a residual mode selection block 350-1, yet the modification of the residual values may occur later than the residual mode selection block 350-1. Although not shown in the Figure, the residual mode control block 360-1 may control one or more of the transform operation 310-1 and the quantize operation 320-1. In one case, the residual mode selection block 350-1 may set control flags for residual elements (e.g. as described above) and these control flags may be used by the residual mode control block 360-1 to control one or more of the transform operation 310-1 and the quantize operation 320-1, or a further operation following the quantize operation 320-1. In one case, all residual values may be processed by the transform operation 310-1 and the quantize operation 320-1 yet filtered, weighted and/or set to zero via the residual mode control block 360-1. In another case, the quantize operation 320-1 may be configured to apply a coarser level of quantization based on a rank or priority of a residual (including binary ranks and priorities), such that the quantization operation 320-1 effectively sets a greater proportion of residual values to zero as compared to a case wherein a residual mode is not activated.

The residual mode control block 360-1 optionally also provides a degree of feedback and analyses the residuals after the effect of the processing to determine if the processing is having an appropriate effect or if it should be adjusted.

Figure 8:
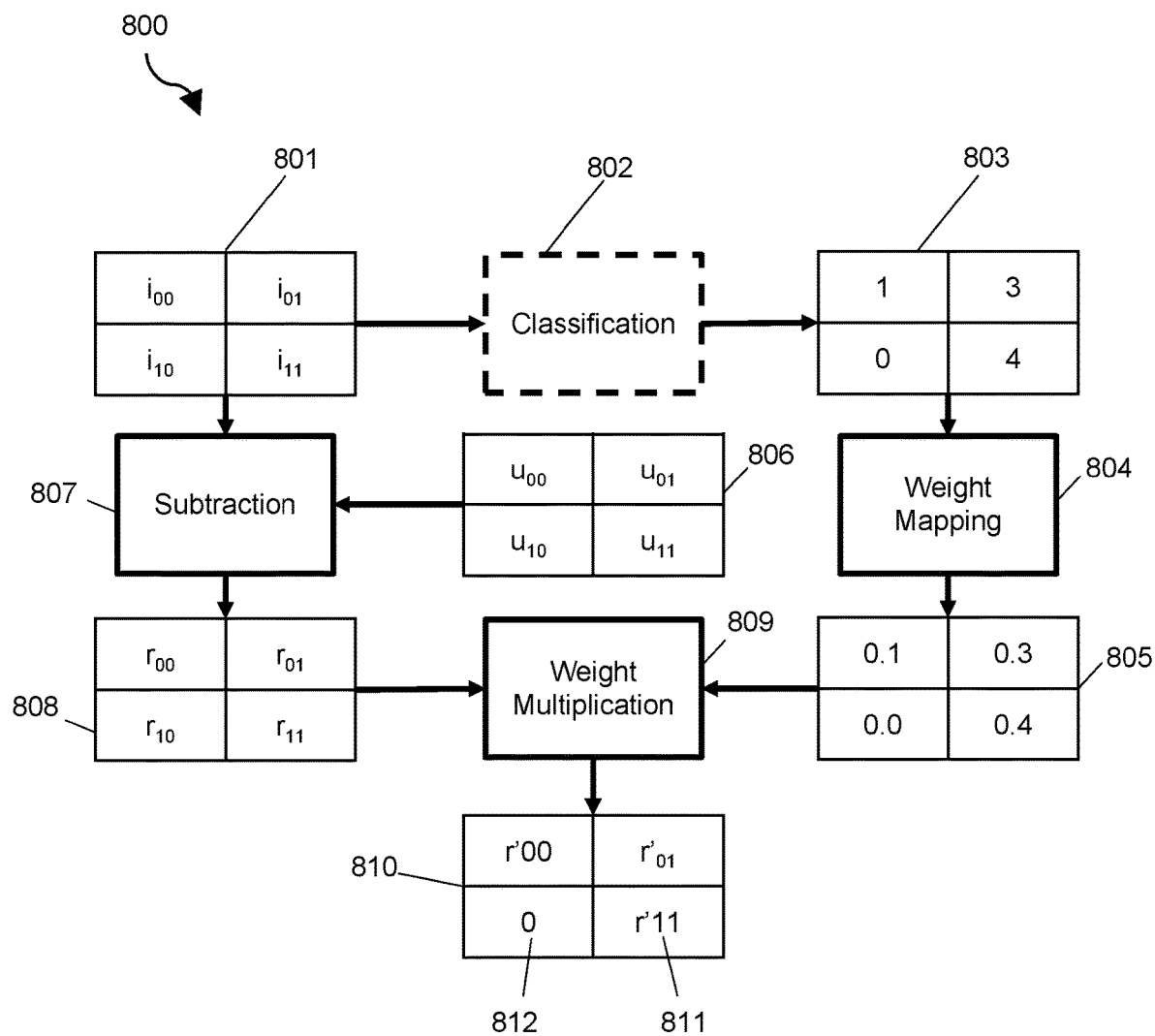
FIG. 8 shows classification and residuals weighting.

FIG. 8 shows an example 800 of a residual mode being applied. The example 800 relates to an example whereby classification (i.e. categorisation) and weighting is applied. Concepts described with reference to the present example may also be applied in part to other residual modes. This example relates to a L-2 stream but a similar set of components may be provided for a L-1 stream. The example is described with reference to a 2×2 coding unit but other coding units and/or pixel groupings may be used. A set of input image elements 801 (shown as pixel values $i_{ij}$—e.g. these may be a 16-bit or 8-bit integer representing a particular colour component, such as one of YUV or RGB, where i indicates an image row and j indicates an image column) are classified via a classification process 802 to generate a set of class indications 803 (e.g. in an integer range of 0 to 4 representing 5 classes). The class may indicate a level of contrast and/or texture. In other examples, the "class" may comprise a range for a metric, such as a contrast and/or texture metric for a grouping of pixels or residuals.

In FIG. 8, the class indications 803 are then used by a weight mapping component 804 to retrieve a set of weights 805 associated with the class indications 803. In this simple example, the weights are a set of values between 0 and 1. Each class may have an associated weight that may be retrieved from a look-up table. In other cases, each weight may be a function of a class or metric value (e.g. as an example the weights in FIG. 8 are $1/10^{th}$ of the class value but the relationship between class value and weight may be any relationship as set by a lookup table).

In parallel in FIG. 8, a set of reconstructed upsampled elements 806 (shown as elements $u_{ij}$) are subtracted, by a subtraction component 807, from the input image elements 801 to generate an initial set of residuals 808 (shown as elements $r_{ij}$). As is shown in the Figure, each coding unit or block of residual values may be associated with a corresponding coding unit or block of picture elements and/or reconstructed picture elements at a particular resolution (for level 1 residuals, a similar process may apply but the picture elements may correspond to downsampled pixels). The residuals 808 and the set of weights 805 are then input to a weight multiplication component 809 that multiplies the residuals 808 by the set of weights 805 to output a set of modified residuals 810 (shown as $r'_{ij}$). As may be seen, a weight of 0 may act to set a subset of the residuals to 0 (see 812). As such in the example of FIG. 8, the original residual value $r_{10}$ is not passed on to further processing, instead it is set to 0. Residuals that have a non-zero weight applied (such as 811) are passed on for further processing but have been modified. In a simple case with binary weights (e.g. two classes), then a weight of 1 may indicate that the residual value is to be processed without modification. Non-zero weights may modify residuals in a manner that modifies how they are encoded. For example, the classification at block 802 may comprise an image classification, whereby residuals are modified based on the image classification of particular pixels. In another case, the classification at block 802 may comprise assigning the image values 801 to a particular grouping based on one or more of luma and contrast. In other examples, the classification at block 802 may select a single class and weight for the coding unit of four elements.

In certain cases, the characterization may be performed at a location remote from the encoder and communicated to the encoder. For example, a pre-recorded movie or television show may be processed once (e.g. by applying classification 802 and weight mapping 804) to determine a set of weights 805 for a set of residuals or group of residuals. These weights may be communicated over a network to the encoder, e.g. they may comprise the residual masks described with reference to FIGS. 9A to 9C, as will be described in more detail below.

In one case, instead of, or as well as weighting the residuals, the residuals may be compared against one or more thresholds derived from the categorization process. For example, the categorisation process may determine a set of classes that have an associated set of weights and thresholds, or just an associated set of thresholds. In this case, the residuals are compared with the determined thresholds and residuals that fall below a certain one or more thresholds are discarded and not encoded. For example, additional threshold processing may be applied to the modified residuals from FIG. 8 and/or the weight mapping 804 and weight multiplication 809 stages may be replaced with threshold mapping and threshold application stages. In general, in both cases for this example, residuals are modified for further processing based on a categorisation process, where the categorisation process may be applied to corresponding image elements.

In certain cases, e.g. as described in the example of FIG. 8, selectively modifying the one or more sets of residuals comprises weighting the one or more sets of residuals prior to a transformation. In one case, this weighting may be performed conditionally based on the sum of absolute differences (SAD) pixel metric. For example, a SAD pixel metric may be computed based on a comparison between a current frame of the input video and a subsequent frame of the input video (e.g. based on SAD pixel metrics for corresponding coding units). A frame-wide metric for the current frame may be determined based on individual coding unit metrics and the frame-wide metric may be compared to a predefined threshold to selectively apply the weighting. For example, if the frame-wide metric is below a given threshold, then the weighting may be deactivated. In other cases, the threshold may be applied on a coding-unit but coding-unit basis. For example, a SAD pixel metric may be computed for pairs of coding units in a current frame and a subsequent frame, and then be used to determined whether weighting is to be applied to the first coding unit of a pair for the current frame. Hence, weighting may be selectively applied at a coding unit level such that coding units that contain text and logos may be detected (e.g. they may have a SAD pixel metric below a threshold) and the weighting turned off or deactivated for these coding units to preserve sharp edges.

Note that illustrated in FIG. 8, for one particular implementation, a local classification step may be optional (e.g. as indicated by the dotted line). In this case, one or more of the class indications 803 and the set of weights 805 may be obtained by a local process (e.g. from a remote location and/or from a stored file).

The above described methods of residual mode processing may be applied at the encoder but not applied at the decoder. This thus represents a form of asymmetrical encoding that may take into account increased resources at the encoder to improve communication. For example, residuals may be weighted to reduce a size of data transmitted between the encoder and decoder, allowing increases of quality for constrained bit rates (e.g. where the residuals that are discarded have a reduced detectability at the decoder). Residual weighting may have a complex effect on transformation and quantization. Hence, residual weights may be applied so as to control the transformation and quantization operations, e.g. to optimise a bit-stream given a particular available bandwidth.

Figure 9A:
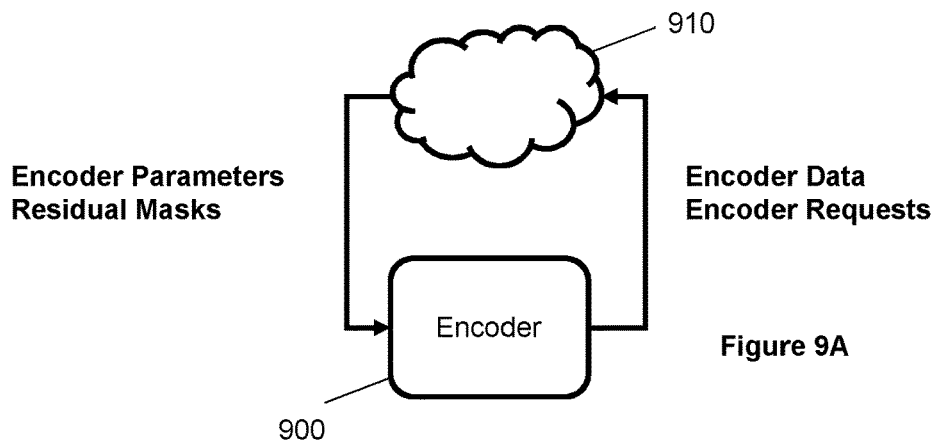
FIGS. 9*a* to 9*c* shows a cloud configuration.

In certain examples, an encoder (or encoding process) may communicate with one or more remote devices. FIG. 9A shows an encoder 900 communicating across a network 910 (represented by a cloud in the Figure). The encoder may comprise an implementation of any of the encoders from the previous Figures, e.g. the low complexity encoder of FIG. 1 or the encoder 300 of any of FIG. 3, 5 or 7. In one case, the encoder 900 may receive configuration data across the network 910 and/or transmit configuration data across the network 910. In the example of FIG. 9A, the encoder receives one or more of encoder parameters and residual masks. Encoder parameters may comprise values for one or more parameters that control the encoder 900. In one case, encoder parameters may include parameters for one or more of the base encoder, the processing components for the level 1 stream and the processing components for the level 2 stream. The encoder parameters may be used to configure one or more of a stream resolution, quantization, sequence processing, bitrates and codec for each stream. Residual masks may comprise a weighting, e.g. from 0 to 1, to apply to sets of residuals, e.g. to apply to 2×2 or 4×4 groupings (i.e. blocks) of residuals. The residual masks may be similar to one of the class indications 803 and the set of weights 805 in FIG. 8. The residual masks may be applied at a per-residual or per-residual-group (e.g. coding unit or block) level. A residual mask may be supplied as a surface for each frame of video (whereby there may multiple surfaces for different colour components). If the mask is applied at the group level, any received surface may be at a reduce resolution (e.g. for a 2×2 coding block the mask may comprise a video at half-resolution containing residual weight values). The residual masks may indicate a priority for delivery of the blocks to the decoder and/or for encoding. In another case, the residual masks may comprise a weighting that control processing of the blocks, e.g. certain blocks may be visually enhanced or weighted. Weighting may be set based on a class (e.g. a label or numeric value) applied to one or more blocks of residuals. In certain cases, the residual masks may be binary masks (e.g. binary bitmaps) indicating whether to encode the residual values.

In certain cases, the encoder may be adapted to perform encodings at a plurality of bitrates. In this case, the encoder parameters may be supplied for each of the plurality of bitrates. In certain cases, the configuration data that is received from the network may be provided as one or more of global configuration data, per frame data and per block data. In examples, residual masks and temporal signalling may be provided on a per frame basis. For example, the plurality of bitrates may be set based on an available capacity of a communications channel, e.g. a measured bandwidth, and/or a desired use, e.g. use 2 Mbps of a 10 Mbps downlink channel.

The configuration data communicated from the encoder 900 may comprise one or more of a base codec type, a set of required bitrates and sequence information. The base codec type may indicate a type of base encoder that is used for a current set of processing. In certain cases, different base encoders may be available. In one case, the base encoder may be selected based on a received base codec type parameter; in another case, a base codec type may be selected based on local processing within the encoder and communicated across the network. The set of bitrates that are required may indicate one or more bitrates that are to be used to encode one or more of the base stream and the two enhancement streams. Different streams may use different (or respective) bit rates. The enhancement streams may use additional bandwidth if available; e.g. if bandwidth is not available then bandwidth may be used by the encoded base and level 1 streams to provide a first level of quality at a given bitrate; the encoded level 2 stream may then use a second bit rate to provide further improvements. This approach may also be applied differentially to the base and level 2 streams in place of the base and level 1 streams. The residual processing described herein may be used together with bit rate parameters to control a bit rate of one or more of the enhancement streams.

In one case, the encoder parameters received across the network may indicate one or more of residual modes to be applied by the encoder. Again, a residual mode may be set at a per frame, per tile, and/or per block or coding unit level. The encoder parameters may indicate modes for each stream separately or indicate a common mode for both enhancement streams. The residual mode parameters may be received by the residual mode selection components described herein. In certain cases, the residual mode selection components may be omitted and the residual mode parameters may be received by other components of the encoder directly, e.g. the components of examples herein may receive the residual mode parameters from a cloud interface of the encoder. In certain cases, each residual mode may be indicated by an integer value. The residual mode may indicate what form of residual (pre-) processing is to be applied.

In one case, the encoder 900 may have different configuration settings relating to a remote or cloud configuration. In one mode, which may be a "default" mode, the encoder 900 may be configured to make a remote program call across the network to retrieve initial configuration parameters to perform encoding as described herein. In another mode, which may be a "custom" mode, the encoder 900 may retrieve local parameter values that indicate a particular user configuration, e.g. a particular set of tools that are used by the encoder 900 and/or configurations for those tools. In one case, the encoder 900 may have different modes which indicate which parameters are to be retrieved from a remote device and which parameters are to be retrieved from local storage.

Figure 9B:
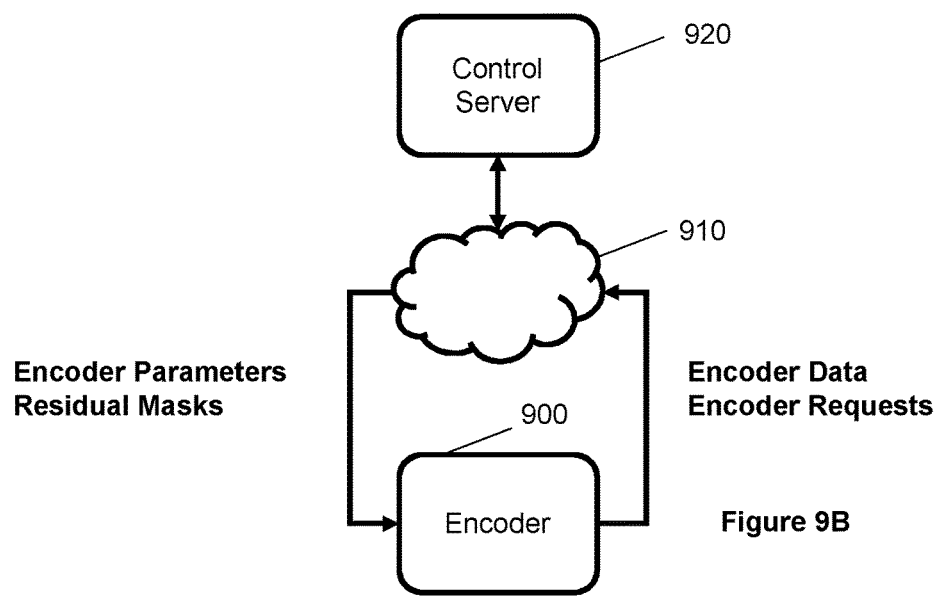

FIG. 9B shows that the encoder 900 may send and/or receive configuration data to and/or from a remote control server 920 over the network 910. The control server 920 may comprise a server computing device that implements an application programming interface for receiving or sending data. For example, the control server 920 may implement a RESTful interface, whereby data may be communicated by (secure) HyperText Transfer Protocol (HTTP) requests and responses. In another case, a side channel implemented using a specific communication protocol (e.g. at the transport or application layer) may be used for communications between the control server 920 and the encoder 900 over the network 910. The network 910 may comprise one or more wired and/or wireless networks, including local and wide area networks. In one case, the network 910 may comprise the Internet.

Figure 9C:
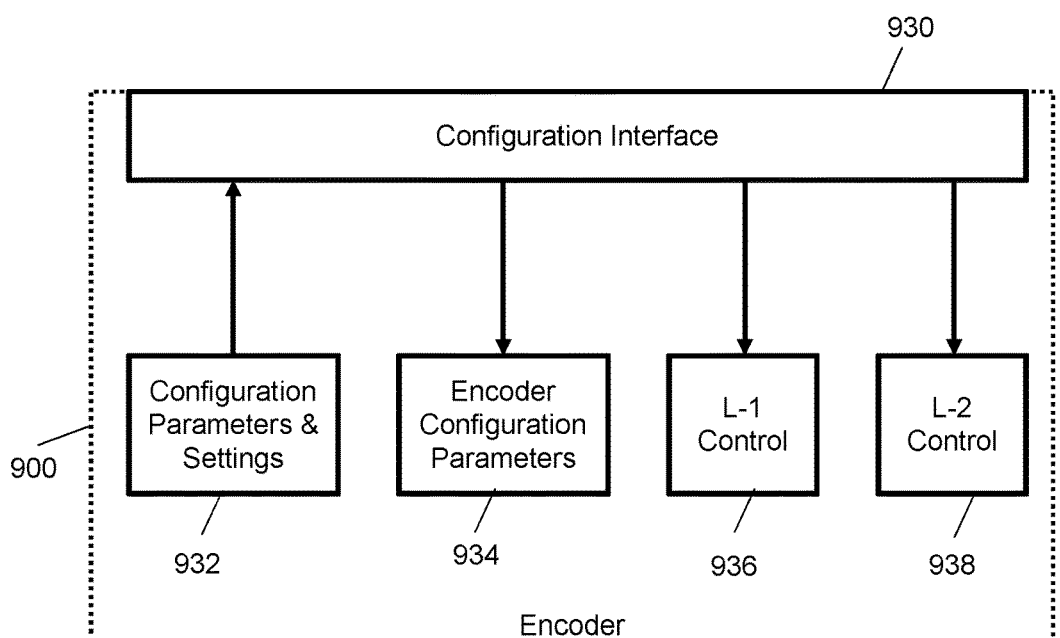

FIG. 9C shows how an encoder 900 may comprise a configuration interface 930 that is configured to communicate over the network 910, e.g. with the remote control server 920. The configuration interface 930 may comprise a hardware interface, e.g. an Ethernet and/or wireless adapter, and/or software to provide a communications stack to communicate over one or more communications networks. In FIG. 9C, configuration parameters and settings 932 that are used and/or stored by the encoder 900 are communicated over the network using the configuration interface 930. Encoder configuration parameters, e.g. that may be stored in one or more memories or registers, are received 934 from the configuration interface. In one case, the encoder configuration parameters may control one or more of downsampling, base encoder and base decoder components within the encoder, e.g. as shown in the Figures. The configuration interface also communicates L-1 control data 936 and L-2 control data 938 data to each of an L-1 and an L-2 stream control component. These components may configure tool use on each enhancement stream. In one case, the L-1 and an L-2 stream control components control one or more of residual mode selection, transform, quantize, residual mode control, and entropy encoding components (e.g. as shown in the Figures and described herein).

Using a cloud configuration as described herein may provide implementation advantages. For example, an encoder 900 may be controlled remotely, e.g. based on network control systems and measurements. An encoder 900 may also be upgraded to provide new functionality by upgrading firmware that provides the enhancement processing, with additional data, e.g. based on measurements or pre-processing being supplied by one or more remote data sources or control servers. This provides a flexible way to upgrade and control legacy hardware devices.

In certain examples, residuals may be considered to be errors or differences at a particular level of quality or resolution. In described examples, there are two levels of quality or resolutions and thus two sets of residuals (L-1 and L-2). Each set of residuals described herein models a different form of error or difference. The L-1 residuals, for example, typically correct for the characteristics of the base encoder, e.g. correct artefacts that are introduced by the base encoder as part of the encoding process. In contrast, the L-2 residuals, for example, typically correct complex effects introduced by the shifting in the levels of quality and differences introduced by the L-1 correction (e.g. artefacts generated over a wider spatial scale, such as areas of 4 or 16 pixels, by the L-1 encoding pipeline). This means it is not obvious that operations performed on one set of residuals will necessarily provide the same effect for another set of residuals, e.g. each set of residuals may have different statistical patterns and sets of correlations.

In the examples described herein residuals are encoded by an encoding pipeline. This may include transformation, quantization and entropy encoding operations. It may also include residual ranking, weighting and filtering. These pipelines are shown in FIGS. 1 and 3A and 3B. Residuals are then transmitted to a decoder, e.g. as L-1 and L-2 enhancement streams, which may be combined with a base stream as a hybrid stream (or transmitted separately). In one case, a bit rate is set for a hybrid data stream that comprises the base stream and both enhancements streams, and then different adaptive bit rates are applied to the individual streams based on the data being processed to meet the set bit rate (e.g. high-quality video that is perceived with low levels of artefacts may be constructed by adaptively assigning a bit rate to different individual streams, even at a frame by frame level, such that constrained data may be used by the most perceptually influential individual streams, which may change as the image data changes).

The sets of residuals as described herein may be seen as sparse data, e.g. in many cases there is no difference for a given pixel or area and the resultant residual value is zero. When looking at the distribution of residuals much of the probability mass is allocated to small residual values located near zero—e.g. for certain videos values of -2, -1, 0, 1, 2 etc. occur the most frequently. In certain cases, the distribution of residual values is symmetric or near symmetric about 0. In certain test video cases, the distribution of residual values was found to take a shape similar to logarithmic or exponential distributions (e.g. symmetrically or near symmetrically) about 0. The exact distribution of residual values may depend on the content of the input video stream.

Residuals may be treated as a two-dimensional image in themselves, e.g. a delta image of differences. Seen in this manner the sparsity of the data may be seen to relate features like "dots", small "lines", "edges", "corners", etc. that are visible in the residual images. It has been found that these features are typically not fully correlated (e.g. in space and/or in time). They have characteristics that differ from the characteristics of the image data they are derived from (e.g. pixel characteristics of the original video signal).

As the characteristics of residuals differ from the characteristics of the image data they are derived from it is generally not possible to apply standard encoding approaches, e.g. such as those found in traditional Moving Picture Experts Group (MPEG) encoding and decoding standards. For example, many comparative schemes use large transforms (e.g. transforms of large areas of pixels in a normal video frame). Due to the characteristics of residuals, e.g. as described above, it would be very inefficient to use these comparative large transforms on residual images. For example, it would be very hard to encode a small dot in a residual image using a large block designed for an area of a normal image.

Certain examples described herein address these issues by instead using small and simple transform kernels (e.g. 2×2 or 4×4 kernels—the Directional Decomposition and the Directional Decomposition Squared—as presented herein). The transform described herein may be applied using a Hadamard matrix (e.g. a 4×4 matrix for a flattened 2×2 coding block or a 16×16 matrix for a flattened 4×4 coding block). This moves in a different direction from comparative video encoding approaches. Applying these new approaches to blocks of residuals generates compression efficiency. For example, certain transforms generate uncorrelated coefficients (e.g. in space) that may be efficiently compressed. While correlations between coefficients may be exploited, e.g. for lines in residual images, these can lead to encoding complexity, which is difficult to implement on legacy and low-resource devices, and often generates other complex artefacts that need to be corrected. Pre-processing residuals by setting certain residual values to 0 (i.e. not forwarding these for processing) may provide a controllable and flexible way to manage bitrates and stream bandwidths, as well as resource use. For example, aggressive residual mode settings may be activated to de-select a greater subset of residuals during times of high computational load and/or reduced bandwidth. Residual pre-processing may offer a complementarily control path to controlling quantization parameters within the encoding pipelines.

Certain examples described herein also consider the temporal characteristics of residuals, e.g. as well as spatial characteristics. For example, in residual images details like "edges" and "dots" that may be observed in residual "images" show little temporal correlation. This is because "edges" in residual images often don't translate or rotate like edges as perceived in a normal video stream. For example, within residual images, "edges" may actually change shape over time, e.g. a head turning may be captured within multiple residual image "edges" but may not move in a standard manner (as the "edge" reflects complex differences that depend on factors such as lighting, scale factors, encoding factors etc.). These temporal aspects of residual images, e.g. residual "video" comprising sequential residual "frames" or "pictures" typically differ from the temporal aspects of conventional images, e.g. normal video frames (e.g. in the Y, U or V planes). Hence, it is not obvious how to apply conventional encoding approaches to residual images; indeed, it has been found that motion compensation approaches from comparative video encoding schemes and standards cannot encode residual data (e.g. in a useful manner). However, by using these temporal characteristics as a basis for residual ranking and filtering it may be possible to discard residual information that has little effect on a perception of a decoded video signal. For example, transient residuals may be de-selected even though they are above a normal quantization dead-zone by the pre-processing stage. Classification and/or scoring based on one or more of luma and contrast may also provide another method to reduce the energy of the residual signal while having a minimal effect on perceptive quality (as human perceptions are biased such that particular luma and contrast patterns are less observable). For example, a sensitivity to contrast differences may be dependent on a mean contrast level, effectively meaning that contrast differences of a set magnitude at low mean contrasts are less detectable than the same contrast differences at a higher mean contrast level. In this case, if a coding unit is classified as having low-mean contrast, then residuals may be de-selected (or more heavily down-weighted) as they will be less perceivable as compared to medium-mean contrast blocks. Similar effects are perceived for different spatial frequencies (i.e. textures), with certain textures being more observable than others. For example, high spatial frequencies on a small scale may be unresolvable and so residuals that are indicated as relating to these (e.g. either via an explicit classification or via a representative metric evaluation) may be given a lower priority or ranking.

Furthermore, many comparative video encoding approaches attempt to provide temporal prediction and motion-compensation as default to conventional video data. These "built-in" approaches may not only fail when applied to sequential residual images, they may take up unnecessary processing resources (e.g. these resources may be used while actually corrupting the video encoding). It may also generate unnecessary bits that take up an assigned bit rate. It is not obvious from conventional approaches how to address these problems.

Putting some of the principles described here together into a specific use case example, an encoder may first analyse an input video to identify certain spatial and/or temporal characteristics of the signal. From these characteristics the encoder may create a weighted residual mask. Let's say for example that the input signal is a news broadcast in which the high proportion of the video is a portrait substantially situated centrally in the frame. It would thus be identified that the background of the video signal does not substantially change temporally and that the detail the viewer wants to see is in the expressions and detail of the portrait in the centre of the frame. Accordingly, the residuals mask will emphasise that the most important residuals to be processed are located within this region of the screen. The encoder will then begin to encode the input video. In the residuals processing step before the residuals are converted into transformed coefficients, the residuals of each frame are compared to the residual weighted mask and the residuals are weighted. According to a predefined threshold set by the encoder, less important ones of the residuals (according to the weighted mask) are de-selected and are not transformed. Thus, less important ones of the residuals mask are not propagated through the pipeline. In summary, in this example only the most important residuals of the image are processed in order to reduce computing resources and to reduce overall data size.

In a similar example, let's say the input video represents a sport. In this example, the encoder may analyse the input video and prepare a set of residual masks for each frame of the video. For example, the residual masks may prioritise the area of the picture in which detail is required such as where the action is fast moving rather than the background of the sports field. Here each frame may be compared to a specific residual weighted mask where the residuals are weighted according to a value between 0 and 1 and then filtered and de-selected according to a threshold. In other examples, an input video may comprise relatively static features to be enhanced, e.g. relatively constant scenes, presentations with text, logos, credits etc. In this case, the residual masks may enhance these static features, e.g. the edges of the features.

Now let's say that instead of the encoder doing an analysis of an input video, a central server proposes a residual weighted mask according to a type of input video. The central server may provide a set of residual weighted masks covering for example sports, movies, news, etc. As the encoder processes the residual, the encoder may use a set of residual weighted masks according to a type of input signal which is being processed.

In a final example, a central server may provide a set of companion residual weighted masks based on a centralised analysis of the input signal, such that the encoder may be made simpler and the analysis is performed at a computationally powerful and able central server and the encoder may be streamlined. That is, the encoder may be 'dumb' and may utilise the provided set of residual masks when processing each of the residuals according to the masks proposed by the central server which has performed the computationally intensive analysis.

Figure 10A:
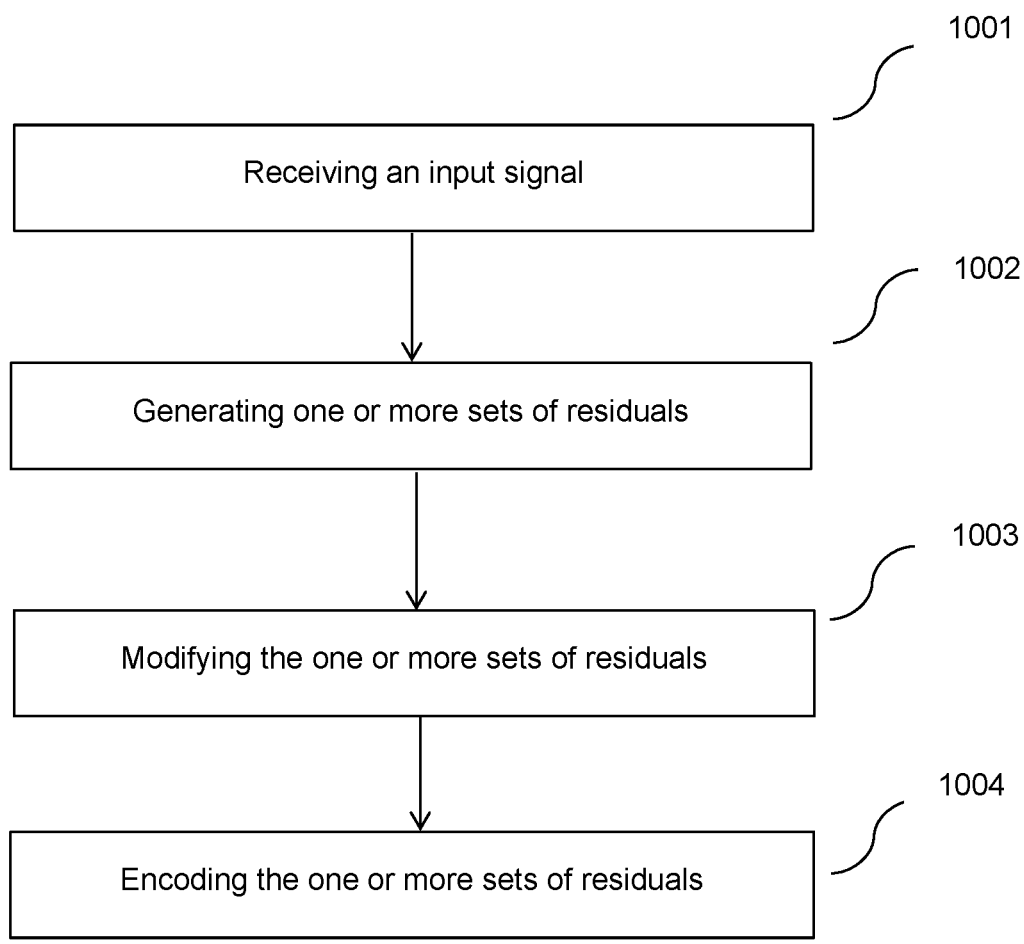
FIG. 10*a* shows a flowchart of concepts described herein.

For completeness, FIG. 10a illustrates a broad principle of the concept described herein in the form of a flowchart. The method 1000 includes: receiving an input signal (step 1001); generating one or more sets of residuals (step 1002); modifying the one or more sets of residuals (step 1003); and: encoding the one or more sets of residuals (step 1004). The signal may comprise a video signal and the input signal at step 1001 may comprise a frame of video, where the method is repeated for a plurality of frames. The method may be adapted to perform the processing of any of the encoders described herein. The method may further comprise sending one or more of the base encoded stream, the first level (L−1) encoded stream and the second level (L−2) encoded stream.

Corresponding decoding methods may also be provided. For example, a method of decoding a plurality of encoded streams into a reconstructed output video may comprise: receiving a first base encoded stream; decoding the first base encoded stream according to a first codec to generate a first output video; receiving one or more further encoded streams; decoding the one or more further encoded streams to generate a set of residuals; and, combining the set of residuals with the first video to generate a decoded video. Further adaptations may be made as described.

In the method 1000 of FIG. 10a, the step of modifying the one or more sets of residuals may comprise: ranking a set of residuals based on a pre-analysis of the set of residuals; and, selecting a subset of residuals to be transformed and encoded. It may alternatively comprise weighting or setting to zero ("killing") certain residuals. It may also involve selecting different transformations for different subsets of residuals. In an example, the method 1000 comprises analysing the set of residuals and, based on the analysis, either performing the following steps or not: ranking the set of residuals; and, selecting a subset of residuals to be transformed and encoded. In an example, the method 1000 comprises analysing the set of residuals, ranking the set of residuals, and selecting a subset of residuals to be transformed and encoded, such that the steps of ranking and/or selecting are performed differentially based on the analysis. In these examples, a step of applying a transform as part of encoding step 1004 is performed on the selected subset of residuals. These steps may be performed on one or more of the level 1 and level 2 sets of residuals as described herein.

In certain cases, step 1003 of the method 1000 comprises: receiving a set of residual weights; and applying the set of residual weights to a set of residuals to generate the modified residuals. For example, this may be applied as per the example of FIG. 8 or as a variation of this example. In one case, the example may adapted so as to threshold the modified residuals using a set of thresholds. In certain examples, one or more of the set of residual weights and the set of thresholds are determined based on a classification of the input video. In certain examples, the set of residual weights comprise a residual mask that is received from a remote location. In certain examples, one or more of the set of residual weights and the set of thresholds are applied to groups of residuals. The residual mask may be a binary mask in a base case, whereby residuals may be ranked as either "to be processed" or "to be discarded".

It was described above how a step of pre-quantization may be included to modify the set of residuals to improve the efficiency of the pipeline. In summary, it was described that the process may determine a set of perception metrics corresponding to the set of residuals; selectively pre-quantize the set of residuals based on the set of perception metrics; and transform and quantize the one or more sets of modified residuals to generate one or more respective encoded streams.

Figure 10B:
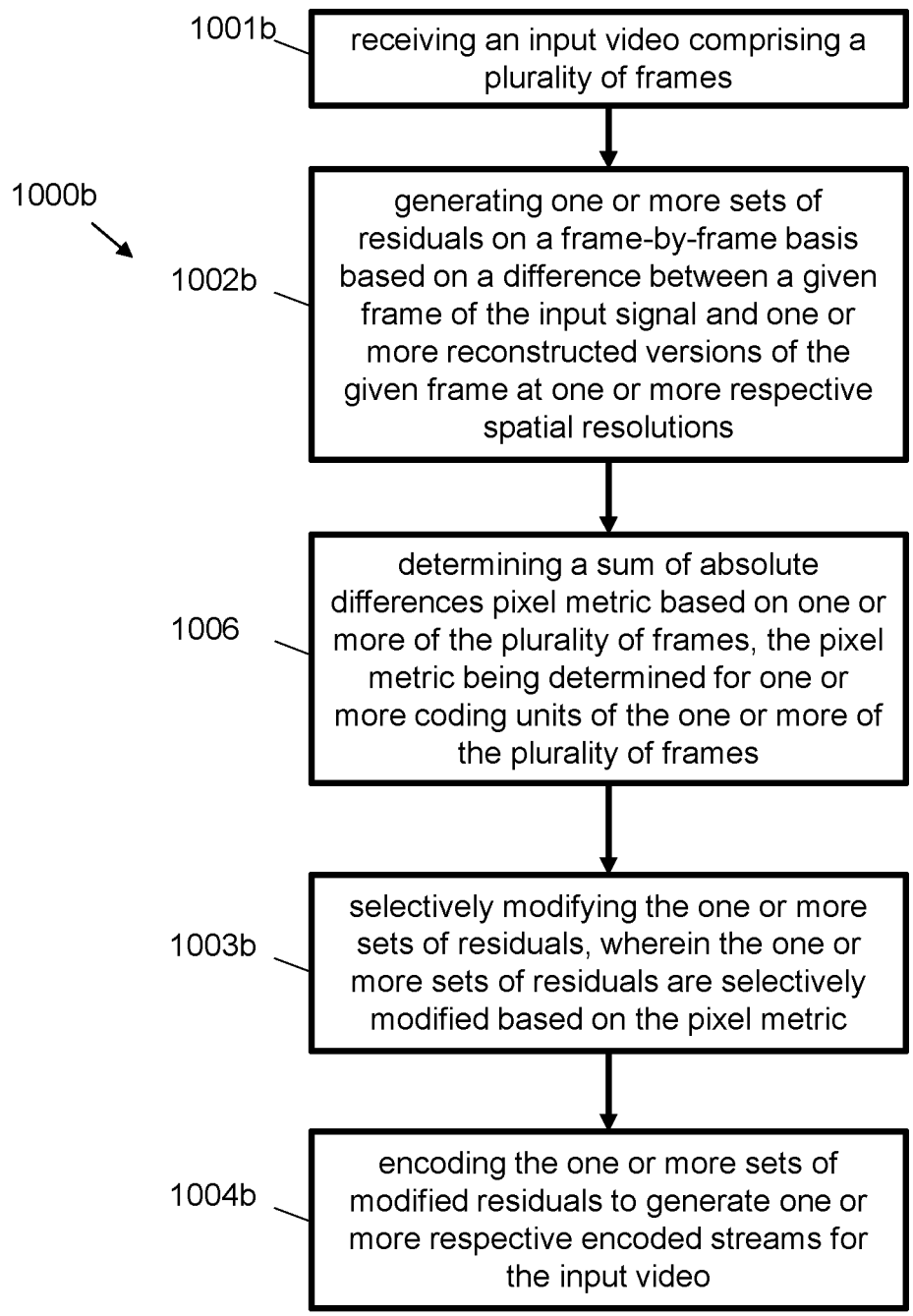
FIG. 10*b* shows a flowchart of concepts described herein.

FIG. 10b illustrates a further embodiment of the concepts described herein in the form of a flowchart for a method, wherein the method utilises a sum of absolute differences. The method further comprises receiving 1001b an input video comprising a plurality of frames. The method further comprises generating 1002b one or more sets of residuals on a frame-by-frame basis based on a difference between a given frame of the input signal and one or more reconstructed versions of the given frame at one or more respective spatial resolutions. The method further comprises determining 1006 a sum of absolute differences pixel metric based on one or more of the plurality of frames, the pixel metric being determined for one or more coding units of the one or more of the plurality of frames. The method further comprises selectively modifying 1003b the one or more sets of residuals, wherein the one or more sets of residuals are selectively modified based on the pixel metric. The method further comprises encoding 1004b the one or more sets of modified residuals to generate one or more respective encoded streams for the input video.

Determining a sum of absolute differences pixel metric may comprise determining a pixel sum of absolute differences at a coding unit level for one or more of the plurality of frames. Determining a sum of absolute differences pixel metric may comprise comparing coding units for two different frames within the plurality of frames.

The sum of absolute differences pixel metric may be computed at a frame level based on an aggregation of sum of absolute differences pixel metrics at the coding unit level. The sum of absolute differences pixel metric can be representative of a level of static features within the input video.

A sum of absolute differences metric may be computed by determining the absolute difference between each pixel in a first coding unit and a corresponding pixel in a second coding unit. Particular coding units may be pre-selected. In one case, a sum of absolute differences metric may be determined for neighbouring coding units. The sum of the individual absolute pixel differences is then computed to provide a metric for a pair of coding units. In one case, the sum of absolute differences metric is computed based on a comparison of the same coding unit across different frames (e.g. the first or central coding unit in a first frame and the first or central coding unit in a subsequent frame). This may then be repeated for a predefined set, or all, coding units. In this manner a set of SAD pixel metrics may be computed for a given current frame for each coding unit, and then a frame-wide metric may be computed by summing the metrics across the coding units. Alternatively, coding unit scale SAD pixel metrics may be used to control selective residual processing for coding units for a current frame.

Figure 10C:
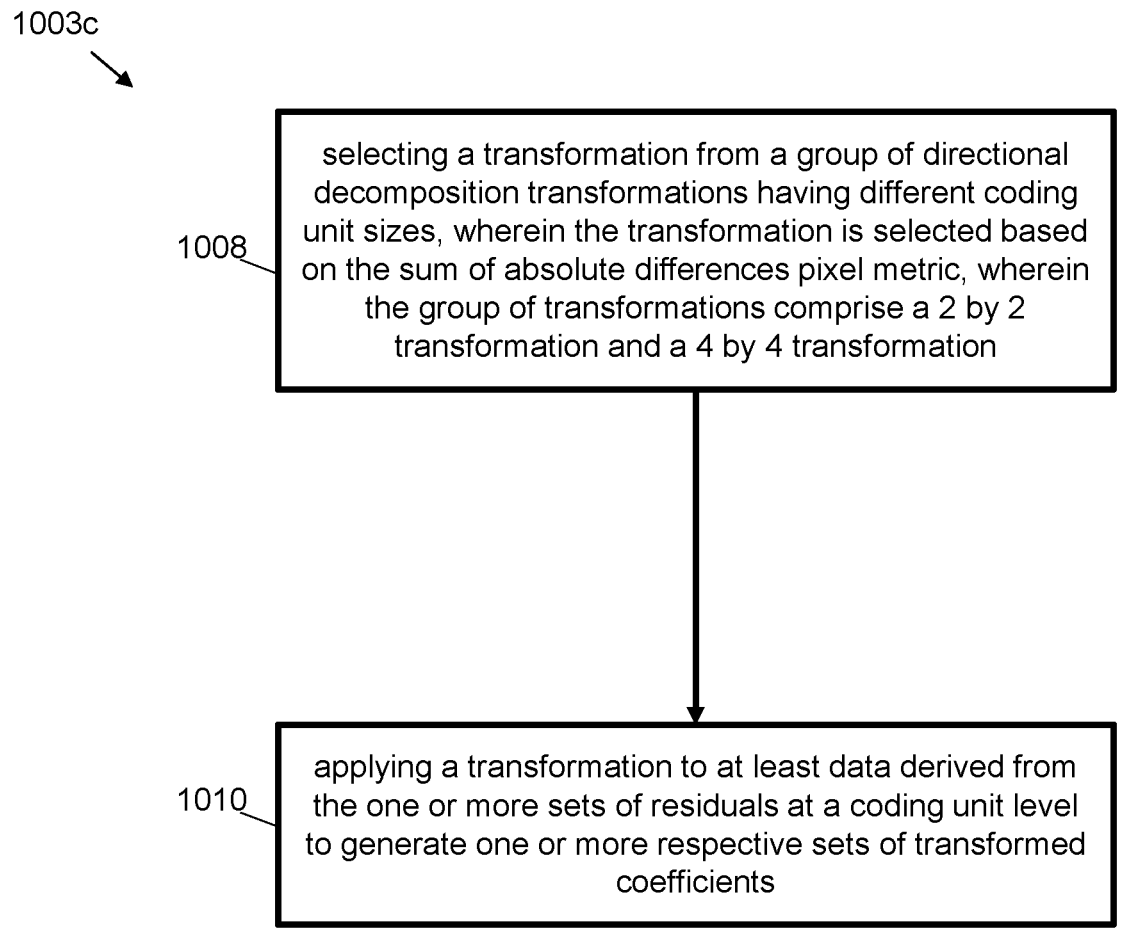
FIG. 10*c* shows a flowchart of an embodiment of a concept illustrated of FIG. 10*b*.

FIG. 10c illustrates (in the form of a flowchart) an example of how the selectively modifying 1003b step (shown in FIG. 10b) may be performed. In such embodiments, the method may comprise selecting 1008 a transformation, for example, from a group of directional decomposition transformations having different coding unit sizes. The transformation may be selected based on the sum of absolute differences pixel metric. The group of transformations may comprise, for example, a 2 by 2 transformation and a 4 by 4 transformation. The sum of absolute differences pixel metric may be computed for a frame based on 2 by 2 coding units for the frame and 2 by 2 coding units for a second, later frame in the input video. In embodiments, the sum of absolute differences between the first and fifth frames of the input sequence is calculated, advantageously, this is done because the first two frames of a sequence (a scene, for example) can often be almost exactly the same. Therefore, a later frame, such as the fifth frame, is compared to the first frame instead, therefore by comparing the frame to a fifth frame then a more accurate indication of static elements is obtained. The method of FIG. 10c further comprises applying 1010 a transformation to at least data derived from the one or more sets of residuals at a coding unit level to generate one or more respective sets of transformed coefficients. A smaller transformation is selected in the case that the sum of absolute differences pixel metric indicates a higher number of static features within the frame and a larger transformation is selected in the case that the sum of absolute differences pixel metric indicates a lower number of static features in the frame. One way of determining the pixel metric is to calculate a percentage of coding units with a pixel SAD equal to zero (i.e. no movement between frames). In embodiments, if more than a predetermined percentage (for example, 7%) of the coding units have a pixel SAD equal to zero, then the sum of absolute differences pixel metric indicates a higher number of static features within the frame and thus a directional decomposition (DD) (e.g. a 2×2 Hadamard transform) transform is used. Otherwise, a directional decomposition squared (DDS) (e.g. a 4×4 Hadamard transform) is chosen. This decision can be made once at the beginning of the sequence/ encoding. Alternatively, the method can evaluate the motion of the sequences whenever a new global configuration is sent, this allows updating of the transform type if the amount of motion changes within the sequence and therefore advantageously adapts the method to better suit each particular scene. In embodiments, the sum of absolute values (SAV) can be computed for 2×2 coding units in the first frame of the sequence. In embodiments, if more than a predetermined percentage (for example, 7%) of the coding units have a SAV smaller than the predetermined percentage, nevertheless a directional decomposition squared (DDS) (e.g. a 4×4 Hadamard transform) may be chosen even though the pixel SAD evaluation may indicate otherwise. In embodiments, the method further comprises: computing a sum of absolute values (SAV) for all 2×2 coding units in a first frame of the input video; responsive to determining that more than a predetermined percentage of the coding units have a SAV smaller than the threshold, selecting a directional decomposition squared as a transform. In embodiments, said selection overrides any other selection of a transform.

Figure 10D:
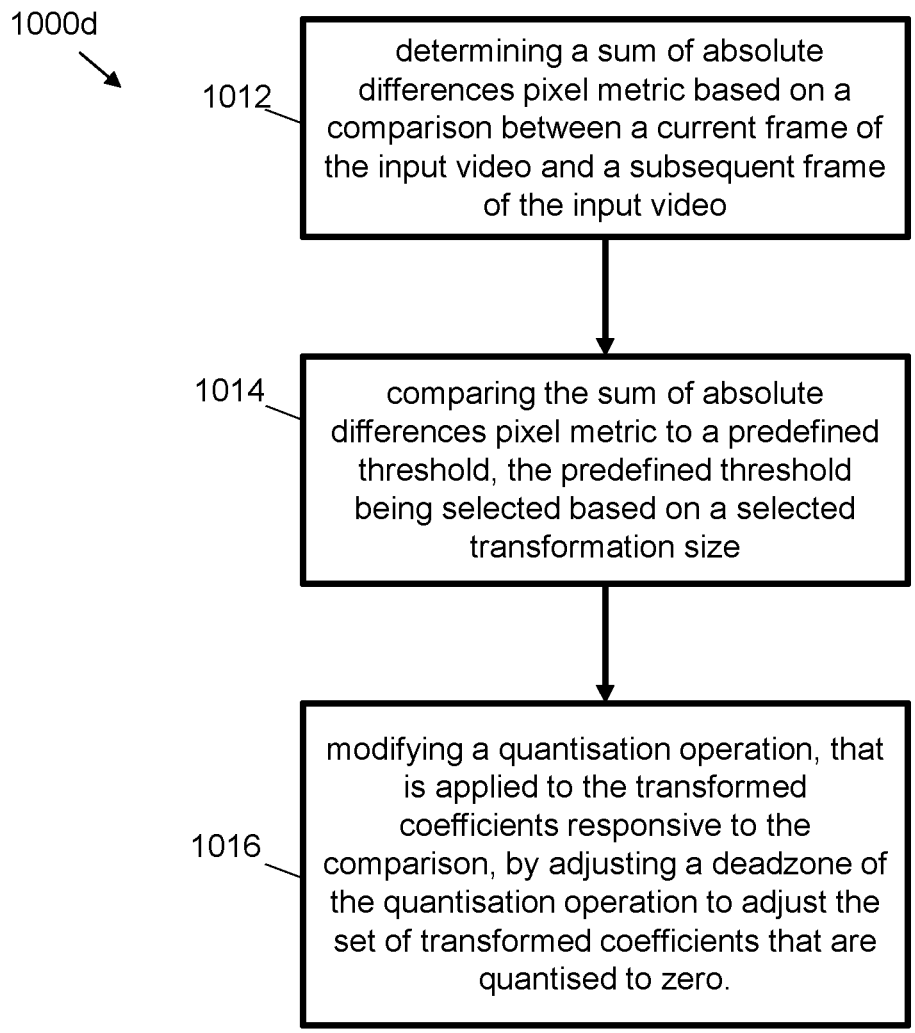
FIG. 10*d* shows a flowchart of an embodiment of a concept illustrated of FIG. 10*b*.
Figure 10E:
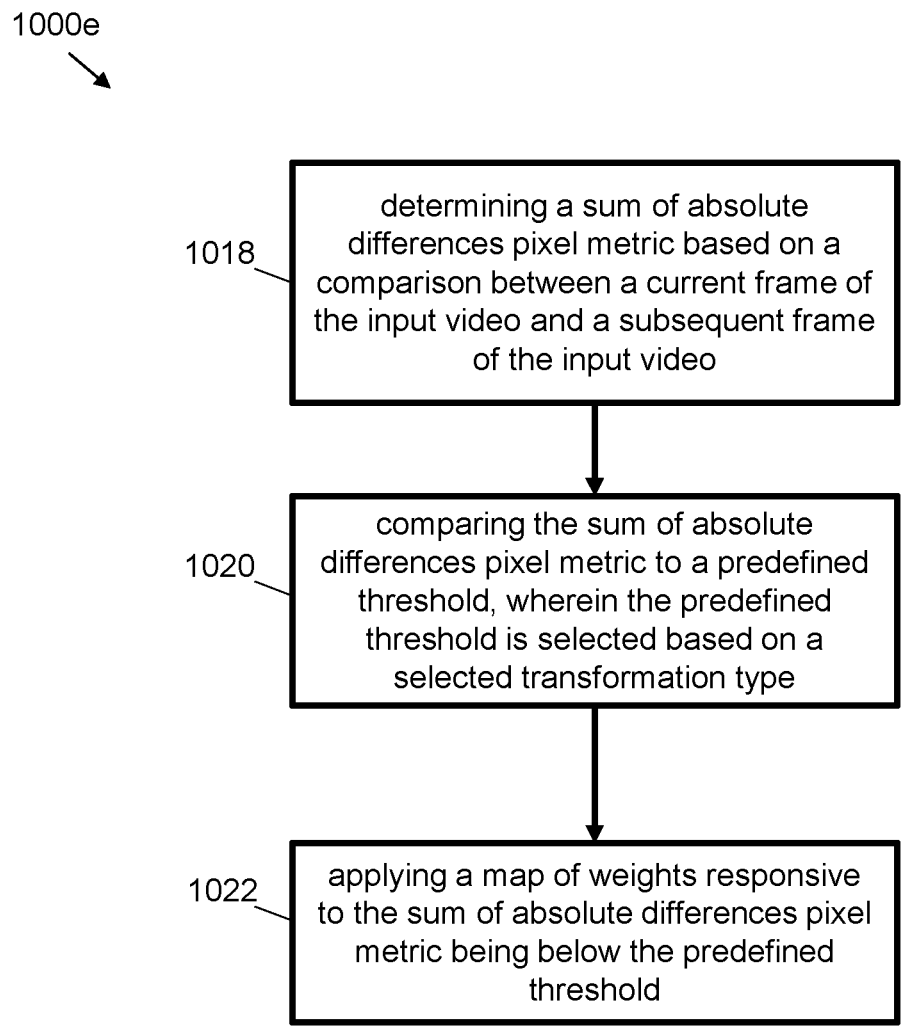
FIG. 10*e* shows a flowchart of an embodiment of a concept illustrated of FIG. 10*b*.

In certain embodiments, selectively modifying the one or more sets of residuals comprises selecting a subset of residuals not to encode and/or a subset of residuals to encode based on the sum of absolute differences pixel metric. One example method of how such modification 1000d is performed is illustrated in the flowchart of FIG. 10d. The method comprises determining 1012 a sum of absolute differences pixel metric based on a comparison between a current frame of the input video and a subsequent frame of the input video, and modifying a quantisation operation that is applied to the transformed coefficients based on the sum of absolute differences pixel metric. In embodiments, a SAD pixel metric is computed by comparing a coding unit of the current frame with a corresponding coding unit for a subsequent frame (i.e. comparing the corresponding coding units to determine the absolute pixel difference). In an embodiment, modifying 1016 the quantisation operation comprising adjusting a deadzone of the quantisation operation to adjust the set of transformed coefficients that are quantised to zero. The method may further comprise comparing 1014 the sum of absolute differences pixel metric (for a coding unit) to a predefined threshold, the predefined threshold being selected based on a selected transformation size, and modifying the quantisation operation responsive to the comparison. In test examples, the threshold for a 2×2 transform coding unit was set as 100 and for a 4×4 transform coding unit was set at 200.

Utilising the SAD pixel metric approach described here will be understood as merely one example of a trigger for optimisation of a quantisation operation (and of course other operations). It will be understood that other triggers may be used together with, or instead of, the SAD pixel metric to trigger and adjust later optimisation operations, such as the quantisation operation exemplified here.

In embodiments, the sum of absolute differences pixel metric can be utilised to selectively modify the one or more sets of residuals in other ways. It will be understood these are non-exhaustive examples. In embodiments, the method comprises determining a sum of absolute differences pixel metric based on a comparison between a current frame of the input video and a subsequent frame of the input video. The sum of absolute differences pixel metric may be computed for a frame based on 2 by 2 coding units for the frame and 2 by 2 coding units for a second, later frame in the input video. In embodiments, sum of absolute differences pixel metric may be computed for a frame based on 4 by 4 coding units for the frame and 4 by 4 coding units for a second, later frame in the input video. In examples, the SAD pixel metric may be calculated for 2 by 2 or 4 by 4 coding units depending on a configuration of the encoder. In response to determining that the SAD metric for a coding unit is larger than a threshold and determining that an un-quantized transform coefficient for the coding unit is not larger than 2 times the step-width, then the transform coefficient is removed. Advantageously, this method removes small residuals if they are located in a moving part of the sequence. The human visual perception struggles to notice these details in a moving part of the sequence, therefore bit rate is reduced without losing visual quality. Further advantageously, the pixel SAD is a low complexity method for evaluating the amount of motion between consecutive frames. In embodiments, the predefined threshold is 6000 when used with for 2×2 transform coding units (DD coding units) and 12000 for 4×4 transform coding units (DDS coding units).

In embodiments, the sum of absolute differences pixel metric can be utilised to selectively modify the one or more sets of residuals in other ways. In embodiments, selectively modifying the one or more sets of residuals comprises weighting the one or more sets of residuals after the transformation and before the quantisation, wherein the weighting is conditionally performed based on the sum of absolute differences pixel metric. In such embodiments, the method may comprise determining 1018 a sum of absolute differences pixel metric based on a comparison between a current frame of the input video and a subsequent frame of the input video. In particular, determining 1018 a sum of absolute differences pixel metric comprises comparing a coding unit of the current frame with a corresponding coding unit for a subsequent frame (i.e. comparing the corresponding coding units to determine the absolute pixel difference) The method may further comprise comparing 1020 the sum of absolute differences pixel metric to a predefined threshold. The predefined threshold may be selected based on a selected transformation type. In embodiments, conditionally applying the weighting based on said comparing comprises applying 1022 a map of weights responsive to the sum of absolute differences pixel metric being below the predefined threshold. In test examples, the predefined threshold was selected as being equal to 500 for 2×2 transform coding units and being equal to 1000 for 4×4 transform coding units. Advantageously, this method increases the clarity of static elements such as logos and text because it preserves sharp edges for frames having a large percentage of static elements. This is in contrast to some method that discard information associated with a static element. If a computed SAD metric for a coding unit is below a threshold then the priority map is not used to modify the coefficients.

The method may further comprise determining a sum of absolute differences pixel metric for a coding unit of the input frame by comparing the coding unit of the current frame with a corresponding coding unit for a subsequent frame to obtain a sum of absolute differences pixel metric for the coding unit. The method may further comprise, responsive to determining that the sum of absolute differences pixel metric for the coding unit is larger than a threshold and determining that a transform coefficient for the coding unit is not larger than a further threshold, removing the transform coefficient for the coding unit. The transform coefficient for the coding unit is removed prior to a performing quantisation operation on the transform coefficient. As an example, the further threshold is equal to two times a step width of the quantisation operation.

Figure 11:
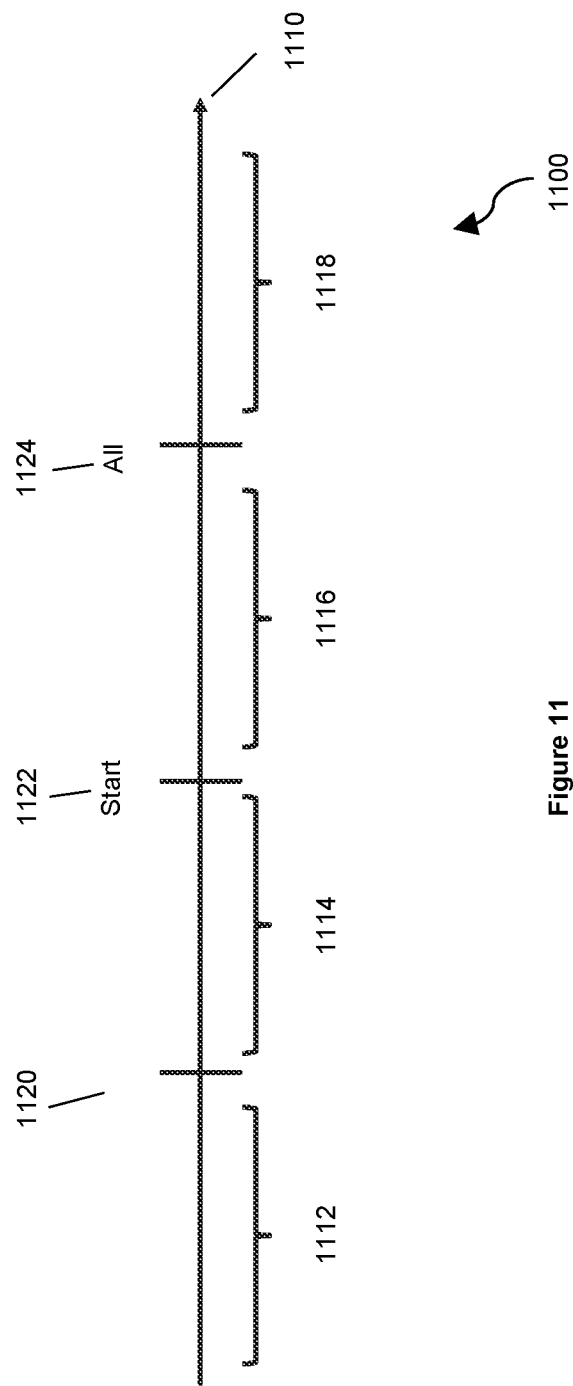
FIG. 11 shows ranges for a perception metric that may be used to identify corresponding actions; and, FIG. 12 shows a flowchart of how a perception metric and the ranges of FIG. 11 may be applied according to a specific example.

FIG. 11 illustrates a diagram of how such pre-quantization may be implemented. In FIG. 11 there is shown an axis 1110 representing values of a perception metric. The process compares a perception metric for one or more residuals to a set of ranges, indicated by the axis 1110. The perception metric in one case may be determined per 2×2 or 4×4 coding unit, or for a 16×16 tile. The perception metric may be determined based on at least luma (e.g. Y) picture elements. The perception metric may be determined for picture elements that correspond to a given set of residuals (e.g. where the picture elements and residuals relate to the same spatial indexes in an image matrix). The perception metric may be based on one or more of texture and contrast as described above. Conceptually, where the perception metric corresponding to a specific residual lies along the visualised axis 1110 indicates which action should be taken for that residual. The axis 1110 of FIG. 11 implies that a high perception metric is negative (e.g. is used to filter out residuals) and a low perception metric indicates a high priority (e.g. is used to pass on residuals for processing) but of course this could be inverted. What is indicated visually is that important residuals have a corresponding perception metric at the left of the axis and less important residuals have a corresponding perception metric at the right of the axis.

Responsive to the perception metric falling in a first range 1118, the one or more residuals are not encoded. That is, residuals with metrics in the first range 1112 are 'killed' or alternatively set or quantized to a 0 value. Conceptually, all residuals after marker 1124 are 'killed'.

Responsive to the perception metric falling in a second range 1116, the one or more residuals are compared to a pre-quantization deadzone, wherein the one or more residuals are not encoded if they fall within the deadzone. The deadzone may be a function of a quantization step width for the residual (e.g. 5 times the step width). The step width may be a dynamic parameter that varies with residual location (e.g. with residual or group of residuals) or a static parameter for all residuals. All residuals with metrics falling between Start marker 1122 and All marker 1124 may be killed if they fall within the defined deadzone, where the Start marker 1122 shows where residuals are starting to be 'killed' using the deadzone and the All marker 1124 shows where all residuals are 'killed' (e.g. regardless of their value). The term threshold could be used interchangeably with the term marker here, however we use the term marker to correspond more closely and visually with the axis of FIG. 11.

In embodiments, the deadzone may be adjusted based on determining 1012 a sum of absolute differences pixel metric based on a comparison between a current frame of an input video and a subsequent frame of the input video (e.g. as described in the examples above where a SAD pixel metric is computed by comparing a coding unit of the current frame with a corresponding coding unit for a subsequent frame (i.e. comparing the corresponding coding units to determine the absolute pixel difference)). The sum of absolute differences pixel metric can be compared to a predefined threshold and the deadzone for the coding unit can be adjusted accordingly. In particular, the deadzone size can be reduced in response to the sum of absolute differences pixel metric indicating a high number of static features. In test implementations, selecting a reduced deadzone as three fifths of the size of the original deadzone worked well but exact reductions may be set based on experimentation. In combination with the reduction of the deadzone, the first bin is expanded by a corresponding amount. This has the advantageous effect of adding detail to static elements such as logos or text. As above, use of SAD pixel metric to trigger deadzone quantization adjustment may be used together with or instead of other triggers.

In embodiments, adjusting the deadzone comprises reducing the deadzone and expanding a first zone adjacent to the deadzone, thereby modifying the quantisation operation such that fewer transformed coefficients are reduced to zero by the quantisation operation. Determining a sum of absolute differences pixel metric based on a comparison between a current frame of the input video and a subsequent frame of the input video is performed for each coding unit of the current frame and comprises comparing a coding unit of the current frame with a corresponding coding unit for the subsequent frame to obtain a sum of absolute differences pixel metric for the coding unit.

Figure 10F:
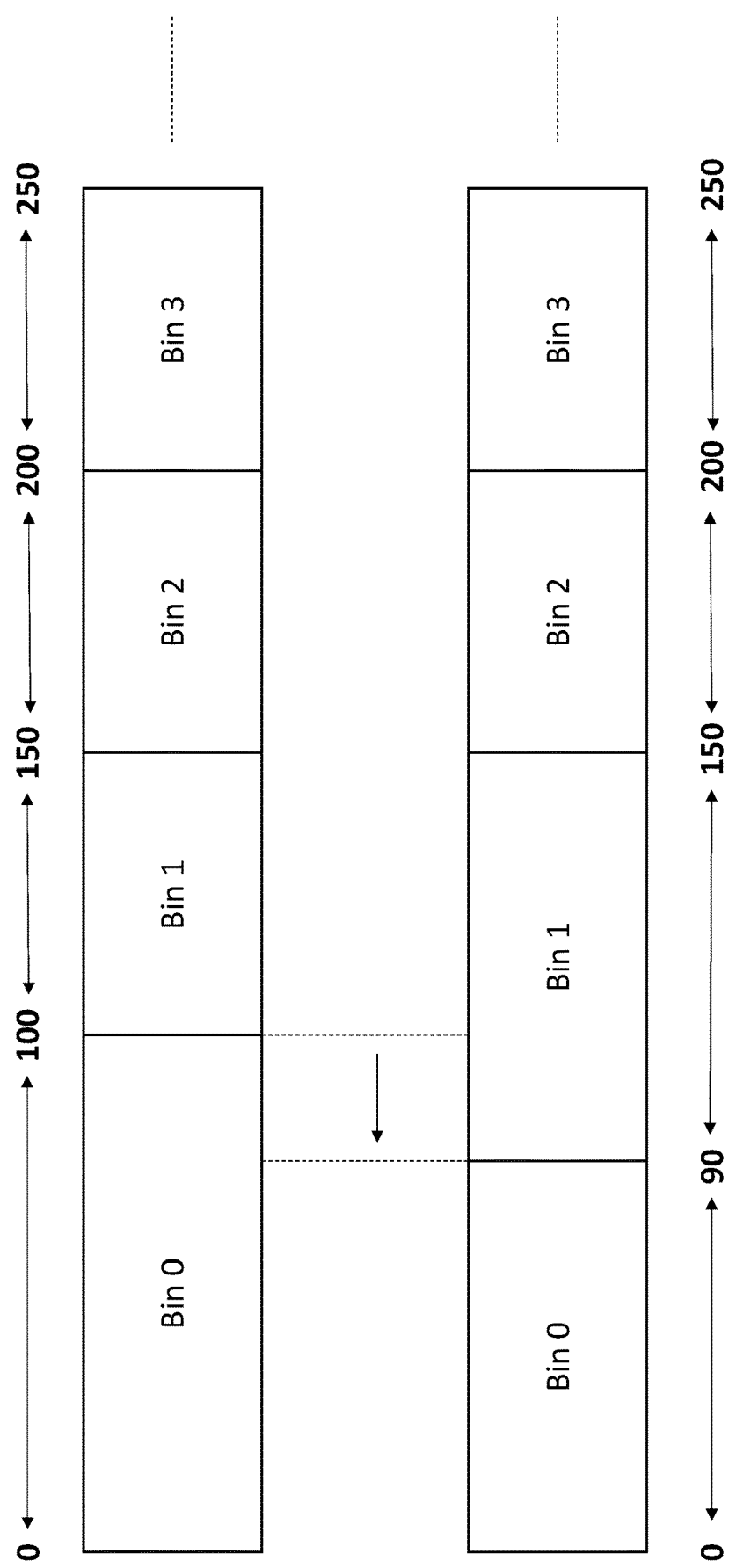
FIG. 10*f* shows a flowchart of an embodiment of a concept illustrated of FIG. 10*b*.

FIG. **10*f* shows such an adjustment, wherein the "correction" corresponds to the amount by which the deadzone (i.e. 'Bin 0') is decreased. As can be seen in FIG. 10*f*, the adjacent zone (i.e. Bin 1) is expanded by a corresponding amount to the amount that the deadzone (i.e. 'Bin 0') is decreased. This has the effect of retaining more transform coefficients because more transform coefficients will now finish in Bin 1 rather than in Bin 0. Keeping more coefficients by moving them from Bin 0 (where they would have been quantized as zero) to Bin 1** has the advantage of allowing more coefficients corresponding to static elements, thus increasing the clarity of static elements such as logos and text.

Note also reducing the size of the deadzone would typically result in a shift of all the other coefficient zones since they are typically determined as a delta with respect to where the previous zone(s) ends. So, for example, if the deadzone corresponds to values 0 to 100, and each other quantization zone has a fixed size of 50, then the deadzone would be between values 0 to 100, the first zone after the deadzone (Bin 1) would be between 101 and 150, the second zone (Bin 2) would be between 151 and 200, and so on. If the deadzone is reduced as described above in order to allow more coefficients to fall within the first zone, and let's assume it is reduced by 10, the deadzone would be between 0 and 90, the first zone between 91 and 140, the second zone between 141 and 190, and so on. However, this would change the quantization not only of the coefficients which would otherwise fall in the deadzone, but also of all the others. In order to avoid that the coefficients in the second zone and higher zones are quantized differently, the size of the first zone is increased, so that the deadzone is decreased (0 to 90), the first zone is increased (91 to 150), and the further zones are kept as they were before the modification (Bin 2 from 151 to 200, Bin 3 from 201 to 250, etc.).

Responsive to the perception metric falling in a third range 1114 between marker or threshold 1120 and the Start marker 1122, the one or more residuals are pre-quantized with a pre-quantization step width. None of these residuals are killed but are pre-quantized with a different set of parameters from normal quantization operations later in the encoding. For example, the pre-quantization step width may be a multiple of a step width used for a later quantization (e.g. double a normal step width).

Responsive to the perception metric falling in a fourth range 1112, the one or more residuals are passed for encoding without modification. Residuals with a high priority (i.e. a good perception metric) are thus not modified.

Figure 12:
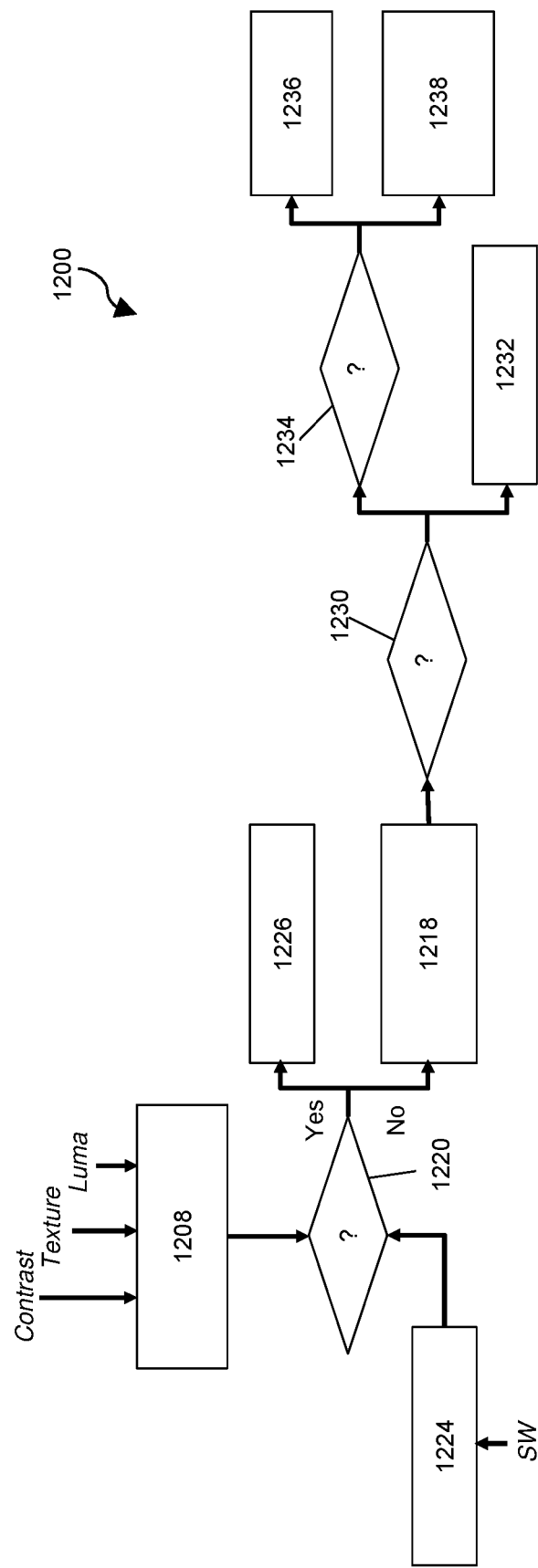

FIG. 12 illustrates conceptually in a flow diagram 1200 how a perception metric could be calculated and modified depending on the set of residuals it corresponds to and how the ranges for corresponding action may be computed or identified. The process considers a group of neighbouring residuals, that is, a neighbouring subset of a set of residuals. This may be a coding unit or tile as described above. An initial perception metric is first identified at block 1208 based on one or more of the contrast, texture or luma of picture elements associated with the group. The perception metric may be determined in a similar manner to that described above and may be based on one or more of picture elements and residuals as also described above (e.g. with reference to FIG. 8). These terms have been utilised elsewhere in this document and in a similar manner as described elsewhere, other characteristics could equally be used to compute the perception metric. In certain cases, an initial perception metric may be computed and then normalised within a predefined range for later comparisons.

The remaining blocks of the method perform a comparison with a set of thresholds similar to those illustrated in FIG. 11. At block 1224, a step width (SW) from a (later) quantization operation for the grouping of residuals is retrieved and used to determine a first threshold value. The ranges and thresholds are described above in the context of FIG. 11. Block 1224 may determine the value for threshold 1120 in FIG. 11. If the perception metric as generated is less than the first threshold value ("yes" in decision 1220) then all residuals are kept, i.e. the metric is in range 1112. If the metric is not less than the first threshold value ("no" in decision 1220) then a set of further thresholds are generated at block 1228. These may comprise thresholds 1122 and 1124 of FIG. 11 or another set of thresholds. These thresholds may be seen as a form of smoothing thresholds when filtering residuals. At block 1230, the perception metric is then compared to a second threshold value (e.g. threshold 1122) at decision block 1230. If the perception metric is in the next range 1114, then the residuals are pre-quantized with a determined step width at block 1232. If the metric is in the further ranges then the metric is compared to a further third threshold value at decision block 1234. The third threshold value may comprise the threshold 1124, Based on this comparison, either all residuals in the grouping are killed at block 1236 or a proportion of the group or set of residuals are killed by applying the deadzone, i.e. by deadzone expansion as explained above.

At both the encoder and decoder, for example implemented in a streaming server or client device or client device decoding from a data store, methods and processes described herein can be embodied as code (e.g., software code) and/or data. The encoder and decoder may be implemented in hardware or software as is well-known in the art of data compression. For example, hardware acceleration using a specifically programmed Graphical Processing Unit (GPU) or a specifically designed Field Programmable Gate Array (FPGA) may provide certain efficiencies. For completeness, such code and data can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium. In certain embodiments, one or more of the steps of the methods and processes described herein can be performed by a processor (e.g., a processor of a computer system or data storage system).

Generally, any of the functionality described in this text or illustrated in the figures can be implemented using software, firmware (e.g., fixed logic circuitry), programmable or non-programmable hardware, or a combination of these implementations. The terms "component" or "function" as used herein generally represents software, firmware, hardware or a combination of these. For instance, in the case of a software implementation, the terms "component" or "function" may refer to program code that performs specified tasks when executed on a processing device or devices. The illustrated separation of components and functions into distinct units may reflect any actual or conceptual physical grouping and allocation of such software and/or hardware and tasks.

The invention claimed is:

1. A method of encoding an input video, the method comprising:
receiving the input video comprising a plurality of frames;
generating one or more sets of residuals on a frame-by-frame basis based on a difference between a given frame of the input signal and one or more reconstructed versions of the given frame at one or more respective spatial resolutions;
selectively modifying the one or more sets of residuals;
encoding the one or more sets of modified residuals to generate one or more respective encoded streams for the input video,
determining a sum of absolute differences pixel metric based on one or more of the plurality of frames, the pixel metric being determined for one or more coding units of the one or more of the plurality of frames;
wherein the one or more sets of residuals are selectively modified based on the pixel metric,
wherein selectively modifying the one or more sets of residuals comprises:
applying a transformation to at least data derived from the one or more sets of residuals at a coding unit level to generate one or more respective sets of transformed coefficients,
selecting the transformation from a group of directional decomposition transformations having different coding unit sizes,
wherein the group of transformations comprise a 2 by 2 transformation and a 4 by 4 transformation, and
wherein a smaller transformation is selected in the case that the sum of absolute differences pixel metric indicates a higher number of static features within the frame and a larger transformation is selected in the case that the sum of absolute differences pixel metric indicates a lower number of static features in the frame.

2. The method of claim 1, wherein determining a sum of absolute differences pixel metric comprises determining a pixel sum of absolute differences at a coding unit level for one or more of the plurality of frames.

3. The method of claim 1, wherein determining a sum of absolute differences pixel metric comprises comparing coding units for two different frames within the plurality of frames.

4. The method of claim 1, wherein the sum of absolute differences pixel metric is computed at a frame level based on an aggregation of sum of absolute differences pixel metrics at the coding unit level.

5. The method of claim 1, wherein the sum of absolute differences pixel metric is representative of a level of static features within the input video.

6. The method of claim 1, wherein the transformation is selected based on a sum of absolute differences pixel metric computed based on a comparison of coding units for two frames within the plurality of frames,
wherein the sum of absolute differences pixel metric is computed for a frame based on 2 by 2 coding units for the frame and 2 by 2 coding units for a second, later frame in the input video.

7. The method of claim 1, wherein selectively modifying the one or more sets of residuals comprises selecting a subset of residuals not to encode based on the sum of absolute differences pixel metric.

8. The method of claim 7, comprising:
determining a sum of absolute differences pixel metric based on a comparison between a current frame of the input video and a subsequent frame of the input video; and modifying a quantisation operation that is applied to the transformed coefficients based on the sum of absolute differences pixel metric.

9. The method of claim 8, wherein modifying a quantisation operation comprising adjusting a deadzone of the quantisation operation to adjust the set of transformed coefficients that are quantised to zero,
wherein said adjusting comprises reducing the deadzone and expanding a first zone adjacent to the deadzone, thereby modifying the quantisation operation such that fewer transformed coefficients are reduced to zero by the quantisation operation.

10. The method of claim 8, wherein determining a sum of absolute differences pixel metric based on a comparison between a current frame of the input video and a subsequent frame of the input video is performed for each coding unit of the current frame and comprises comparing a coding unit of the current frame with a corresponding coding unit for the subsequent frame to obtain a sum of absolute differences pixel metric for the coding unit.

11. The method of claim 8, further comprising:
comparing the sum of absolute differences pixel metric to a predefined threshold, the predefined threshold being selected based on a selected transformation size; and modifying the quantisation operation responsive to the comparison.

12. The method of claim 1, wherein selectively modifying the one or more sets of residuals comprises:

weighting the one or more sets of residuals after the transformation, and wherein the weighting is conditionally performed based on the sum of absolute differences pixel metric.

13. The method of claim 12, comprising:
determining a sum of absolute differences pixel metric based on a comparison between a current frame of the input video and a subsequent frame of the input video; comparing the sum of absolute differences pixel metric to a predefined threshold; conditionally applying the weighting based on said comparing,
wherein conditionally applying the weighting based on said comparing comprises:
applying a map of weights responsive to the sum of absolute differences pixel metric being below the predefined threshold,
wherein the predefined threshold is selected based on a selected transformation type.

14. The method of claim 1, further comprising:
determining a sum of absolute differences pixel metric for a coding unit of the input frame by comparing the coding unit of the current frame with a corresponding coding unit for a subsequent frame to obtain a sum of absolute differences pixel metric for the coding unit,
responsive to determining that the sum of absolute differences pixel metric for the coding unit is larger than a threshold and determining that a transform coefficient for the coding unit is not larger than a further threshold, removing the transform coefficient for the coding unit.

15. The method of claim 14 wherein the transform coefficient for the coding unit is removed prior to a performing quantisation operation on the transform coefficient,
wherein the further threshold is equal to two times a step width of the quantisation operation.

16. The method of claim 1, further comprising:
computing a sum of absolute values (SAV) for all 2×2 coding units in a first frame of the input video;
responsive to determining that more than a predetermined percentage of the coding units have a SAV smaller than a threshold, overriding any other transform selection by selecting a 4×4 transform as a transform for all coding units.

17. A video encoder comprising:
a processor; and
a non-transitory computer readable medium having stored thereon computer executable code, that when executed by the processor, causes the video encoder to perform the following:
receive an input video comprising a plurality of frames;
generate one or more sets of residuals on a frame-by-frame basis based on a difference between a given frame of the input signal and one or more reconstructed versions of the given frame at one or more respective spatial resolutions;
selectively modify the one or more sets of residuals;
encode the one or more sets of modified residuals to generate one or more respective encoded streams for the input video,
determine a sum of absolute differences pixel metric based on one or more of the plurality of frames, the pixel metric being determined for one or more coding units of the one or more of the plurality of frames; and
wherein the one or more sets of residuals are selectively modified based on the pixel metric,
wherein selectively modifying the one or more sets of residuals comprises:
applying a transformation to at least data derived from the one or more sets of residuals at a coding unit level to generate one or more respective sets of transformed coefficients,
selecting the transformation from a group of directional decomposition transformations having different coding unit sizes,
wherein the group of transformations comprise a 2 by 2 transformation and a 4 by 4 transformation, and
wherein a smaller transformation is selected in the case that the sum of absolute differences pixel metric indicates a higher number of static features within the frame and a larger transformation is selected in the case that the sum of absolute differences pixel metric indicates a lower number of static features in the frame.

18. A non-transitory computer readable medium having stored thereon computer executable code, that when executed by a processor, causes the processor to perform the following:
receive an input video comprising a plurality of frames;
generate one or more sets of residuals on a frame-by-frame basis based on a difference between a given frame of the input signal and one or more reconstructed versions of the given frame at one or more respective spatial resolutions;
selectively modify the one or more sets of residuals;
encode the one or more sets of modified residuals to generate one or more respective encoded streams for the input video,
determine a sum of absolute differences pixel metric based on one or more of the plurality of frames, the pixel metric being determined for one or more coding units of the one or more of the plurality of frames; and
wherein the one or more sets of residuals are selectively modified based on the pixel metric,
wherein selectively modifying the one or more sets of residuals comprises:
applying a transformation to at least data derived from the one or more sets of residuals at a coding unit level to generate one or more respective sets of transformed coefficients,
selecting the transformation from a group of directional decomposition transformations having different coding unit sizes,
wherein the group of transformations comprise a 2 by 2 transformation and a 4 by 4 transformation, and
wherein a smaller transformation is selected in the case that the sum of absolute differences pixel metric indicates a higher number of static features within the frame and a larger transformation is selected in the case that the sum of absolute differences pixel metric indicates a lower number of static features in the frame.

* * * * *